(12) United States Patent (10) Patent No.: US 7,962,235 B2
Maida (45) Date of Patent: Jun. 14, 2011

(54) OPERATION INSTRUCTING SYSTEM, METHOD FOR INSTRUCTING OPERATION, AND OPERATION INSTRUCTING APPARATUS

(75) Inventor: Masatomo Maida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/559,809

(22) Filed: Sep. 15, 2009

(65) Prior Publication Data

US 2010/0004776 A1 Jan. 7, 2010

Related U.S. Application Data

(63) Continuation of application No. PCT/JP2007/056330, filed on Mar. 27, 2007.

(51) Int. Cl.
*G05B 11/01* (2006.01)
*G05B 19/418* (2006.01)
*G06F 11/00* (2006.01)
*B23P 11/00* (2006.01)

(52) U.S. Cl. .................. 700/111; 714/25; 705/9; 29/430

(58) Field of Classification Search .................. 700/111; 705/9; 714/25
See application file for complete search history.

(56) References Cited

U.S. PATENT DOCUMENTS

| 6,477,437 B1* | 11/2002 | Hirota ............................. 700/95 |
| 2005/0033469 A1* | 2/2005 | Matsuzaki et al. ............. 700/111 |
| 2005/0228708 A1* | 10/2005 | Catala et al. ..................... 705/9 |
| 2005/0278055 A1* | 12/2005 | Ferguson et al. ............. 700/111 |
| 2006/0282191 A1* | 12/2006 | Gotfried ........................ 700/111 |

FOREIGN PATENT DOCUMENTS

| JP | 5-123947 | 5/1993 |
| JP | 2000-246597 | * 9/2000 |
| JP | 2004-38436 | 2/2004 |
| JP | 2004-038436 | * 5/2004 |
| JP | 2005-346243 | 12/2005 |
| JP | 2006-163889 | 6/2006 |
| JP | 2006-227978 | 8/2006 |

* cited by examiner

*Primary Examiner* — Albert Decady
*Assistant Examiner* — Sivalingam Sivanesan
(74) *Attorney, Agent, or Firm* — Fujitsu Patent Center

(57) ABSTRACT

An operation instructing system includes an individual process information obtaining section obtaining, each time a production element is entered into the system, the process information about one of the production lines to produce the entered production element; a state information obtaining section obtaining, on the basis of the process information, state information about remaining production processes the production elements currently in the production system; a determining section determining, each time operation completion report is obtained, the next manual step by the operator completed a manual step as a next operation step on the basis of the state information; and a notifying section notifying the operator of the next operation step. Accordingly, even when preferential degrees of operations randomly vary, operation shares of respective operators are clearly determined and the next operation steps are accurately notified to respective operator, so that the production efficiency can be improved.

12 Claims, 13 Drawing Sheets

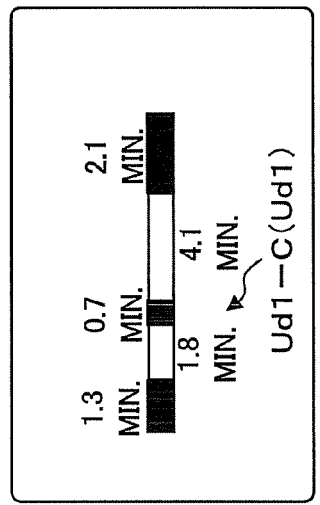
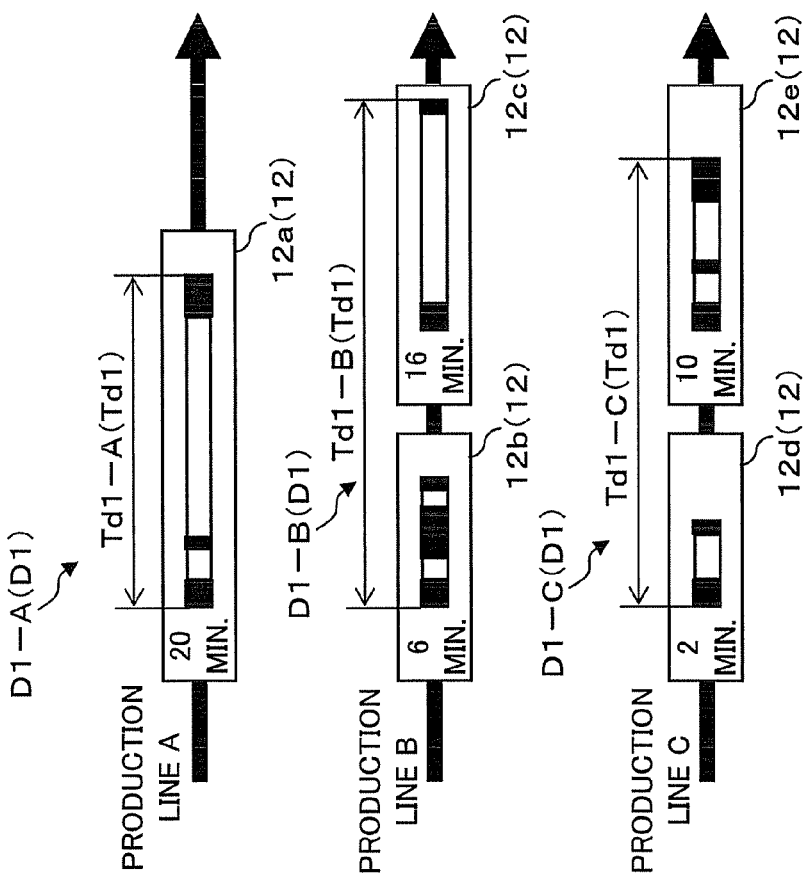

OPERATION INSTRUCTING SYSTEM, METHOD FOR INSTRUCTING OPERATION, AND OPERATION INSTRUCTING APPARATUS

CROSS-REFERENCE TO RELATED APPLICATION(S)

This application is a continuation Application of a PCT international application No. PCT/JP2007/056330 filed on Mar. 27, 2007 in Japan, the entire contents of which are incorporated by reference.

FIELD

The present invention discussed herein is a technique preferably used to notify an operation instruction considering the preference of each operation to an operator who takes over processing, such as assembly and inspection, in a production factory of electronic devices and others.

BACKGROUND

FIG. 13 illustrates an example of the configuration of a conventional production system.

The production system 101 performs various kinds of processing on a number of kinds of production elements (products) e1-e7 successively entered into the system, and includes an automatic machine process 80 as illustrated in FIG. 13.

Hereinafter, description will now be made in relation to an example of the configuration of the automatic machine process 80 with reference to FIG. 13.

The automatic machine process 80 processes the production elements e1-e7 and includes production lines A, B, and C.

Hereinafter, the reference numbers A, B, and C are used when one of a number of production lines needs to be discriminated from the remaining lines, but an arbitrary production line is represented simply by the word "production line" without using a reference number. In addition, the reference numbers e1-e7 are used when one of a number of production elements needs to be discriminated from the remaining elements, but an arbitrary production element is represented by the reference symbol "e".

The automatic machine process 80 sorts production elements e entered into the automatic machine process 80 to any one of the production lines A, B, and C by the kinds of production elements e. In the example of FIG. 13, the production element e1 and the production element e4 are sorted into the production line A; the production element e2, the production element e5, and the production element e7 are sorted into the production line B; and the production element e3 and the production element e6 are sorted into the production line C in accordance with the kinds of production elements e.

In addition, each of the production lines A, B, and C is equipped with one or more automated machines 81a-81e. In the example of FIG. 13, the production line A is equipped with an automated machine 81a; the production line B is equipped with an automated machine 81b and an automated machine 81c; and the production line C is equipped with an automated machine 81d and an automated machine 81e.

Hereinafter, the reference numbers 81a-81e are used when one of a number of automated machines needs to be discriminated from the remaining machines, but an arbitrary automated machine is represented by the reference number "81".

An automated machine 81 processes a production element e. An operation process performed by the automated machine 81 consists of a number of unit processing steps (not illustrated) arranged in time series. The unit processing steps representing various steps (processing steps) performed in an automated machine 81 in units determined according to the contents of the processing steps, and includes manual steps, such as setup, performed by an operator and automatic steps representing processing automatically carried out by an automated machine 81.

Shares of the operation performed by respective operators X and Y are not clearly defined, and therefore each of the manual steps at automatic machines 81a-81e is carried out by either the operator X and Y.

In the automatic machine process 80, the operators X and Y split up to take over respective different manual steps.

Into such an automatic machine process 80, a number of production elements e1-e7 are successively input and are each processed in either one of the production lines A, B, and C. The production elements e that underwent processing are successively ejected out of the automatic machine process 80 to serve as processed product in the same order of into the automatic machine process 80.

In a typical automatic machine process 80, when operation processing steps of an automated machine 81 include a manual step, the next unit processing steps is not carried out in the automatic machine 81 until the operator finishes the manual step. Therefore, each of operators X and Y are required to efficiently carry out operation.

In order to efficiently carry out operation by a number of operators X and Y in an automatic machine process 80, there have been proposed various methods of notifying operators of instructions of manual steps that the operators should preferentially take over next.

For example, one of the methods recognizes manual steps and notifies operators of instructions of all the recognized manual steps and the preferential order of the manual steps.

Another method recognizes a bottleneck step and preferentially instructs the operators of operation at any production line and any automatic machine. Further, a method preferentially instructs the operators to carry out manual steps on elements entered into the system earlier on the basis of the principle of first-in first-out.

For example, the Patent Reference 1 below discloses a method in which a source terminal forwards, when an operation needs to be carried out, the operation contents, the preferential degree of the operation, the preferential of a test machine, and the preferential degree of a previously-entered to each terminal and each terminal instructs an test machine that is to carry out the operation, considering the preferential degrees.

[Patent Reference 1] Japanese Patent Application Laid-Open (KOKAI) Publication No. 2006-163889

However, in a mixed production in which a number of production elements e1-e7 without possessing regularity are entered into a production system and the entered production elements e1-e7 are successively processed, the combinations of the production elements e1-e7 currently in the automatic machine process 80 occasionally varies, so that a preferential operation, a preferential automatic machine and a preferential degree of a previously-entered are randomly changed. This is because the contents and the required time of a processing step vary with the kind of production element e.

Therefore, even when the above conventional methods are applied to such mixed production, it is problematically impossible to appropriately set the degree of preference of each manual step to be carried out by an operator.

In addition, since the operators X and Y does not clearly split up to take over operations, concurrent instructions of preferential order of manual steps to be varied out by the respective operators sometimes results in redundancy in operation.

In addition, the technique of the above Patent Reference 1 analyzes the preferential degrees on an assumption that a machines are operating at constant intervals and therefore has a difficulty in issuing operation instruction in which the result of analysis of operation that randomly occurs in mixed production is considered.

SUMMARY

To attain the above object, there is provided a operation instructing system for a production system comprising a plurality of production lines at which production process including manual steps to be carried out by an operator is carried out, into which production system a number of production elements are successively put and in which production system the production elements are produced by the plurality of production lines, the operation instructing system notifying the operator of an instruction of a next manual step to be performed by the operator next, the operation instructing system including: a process information retaining section retaining process information about the production process of each of the plurality of production lines in advance; an individual process information obtaining section obtaining, each time one of the production elements is put into the production system, the process information about one of the plurality of the production lines that is to produce the put production element; a state information obtaining section obtaining, on the basis of the process information obtained by the individual process information obtaining section, state information about remaining production processes that are to be performed on the production elements for each of the production elements currently in the production system; a completion report obtaining section obtaining an operation completion report representing that the operator has completed one of the manual steps; a determining section determining, each time the completion report obtaining section obtains the operation completion report, the next manual step that is to be performed next by the operator, who has completed the one manual step, as a next operation step on the basis of the state information obtained by the state information obtaining section; and a notifying section notifying the operator, who has completed the one manual step, of the next operation step determined by the determining section.

There is provided a method for instructing operation in a production system comprising a plurality of production lines at which production process including manual steps to be carried out by an operator is carried out, into which production system a number of production elements are successively put and in which production system the production elements are produced by the plurality of production lines, the operation instructing system notifying the operator of an instruction of a next manual step to be performed by the operator next, the method including: retaining process information about the production process of each of the plurality of production lines in advance; obtaining, each time one of the production elements is put into the production system, the process information about one of the plurality of the production lines that is to produce the put production element; obtaining, on the basis of the process information obtained in the step of obtaining the process information, state information about remaining production process that are to be performed on the production elements for each of the production elements currently in the production system; obtaining an operation completion report representing that the operator has completed one of the manual steps; determining, each time the step of obtaining completion report obtaining obtains the operation completion report, the next manual step that is to be performed next by the operator, who has completed the one manual step, as a next operation step on the basis of the state information obtained in the step of obtaining state information; and notifying the operator, who has completed the one manual step, of the next operation step determined in the step of determining.

There is provided an operation instructing apparatus for a production system comprising a plurality of production lines at which production process including manual steps to be carried out by an operator is carried out, into which production system a number of production elements are successively put and in which production system the production elements are produced by the plurality of production lines, the operation instructing system notifying the operator of an instruction of a next manual step to be performed by the operator next, the operation instructing apparatus including: a process information retaining section retaining process information about the production process of each of the plurality of production lines in advance; an individual process information obtaining section obtaining, each time one of the production elements is put into the production system, the process information about one of the plurality of the production lines that is to produce the put production element; a state information obtaining section obtaining, on the basis of the process information obtained by the individual process information obtaining section, state information about remaining production processes that are to be performed on the production elements for each of the production elements currently in the production system; a completion report obtaining section obtaining an operation completion report representing that the operator has completed one of the manual step; a determining section determining, each time the completion report obtaining section obtains the operation completion report, the next manual step that is to be performed next by the operator, who has completed the one manual step, as a next operation step on the basis of the state information obtained by the state information obtaining section; and an output section outputting the next operation step determined by the determining step to an notifying section that notifies the operator, who has completed the one manual step, of the next operation step.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 (a) is a diagram depicting process information retained in the process information regaining section of the operation instructing system of the first embodiment arranged for respective production lines; and FIG. 4(b) is a diagram depicting an example of the unit process time of the process information;

DESCRIPTION OF EMBODIMENTS

Hereinafter, description will now be made in relation to a first embodiment of the present invention with reference to the drawings.

(1) First Embodiment

Figure 1:
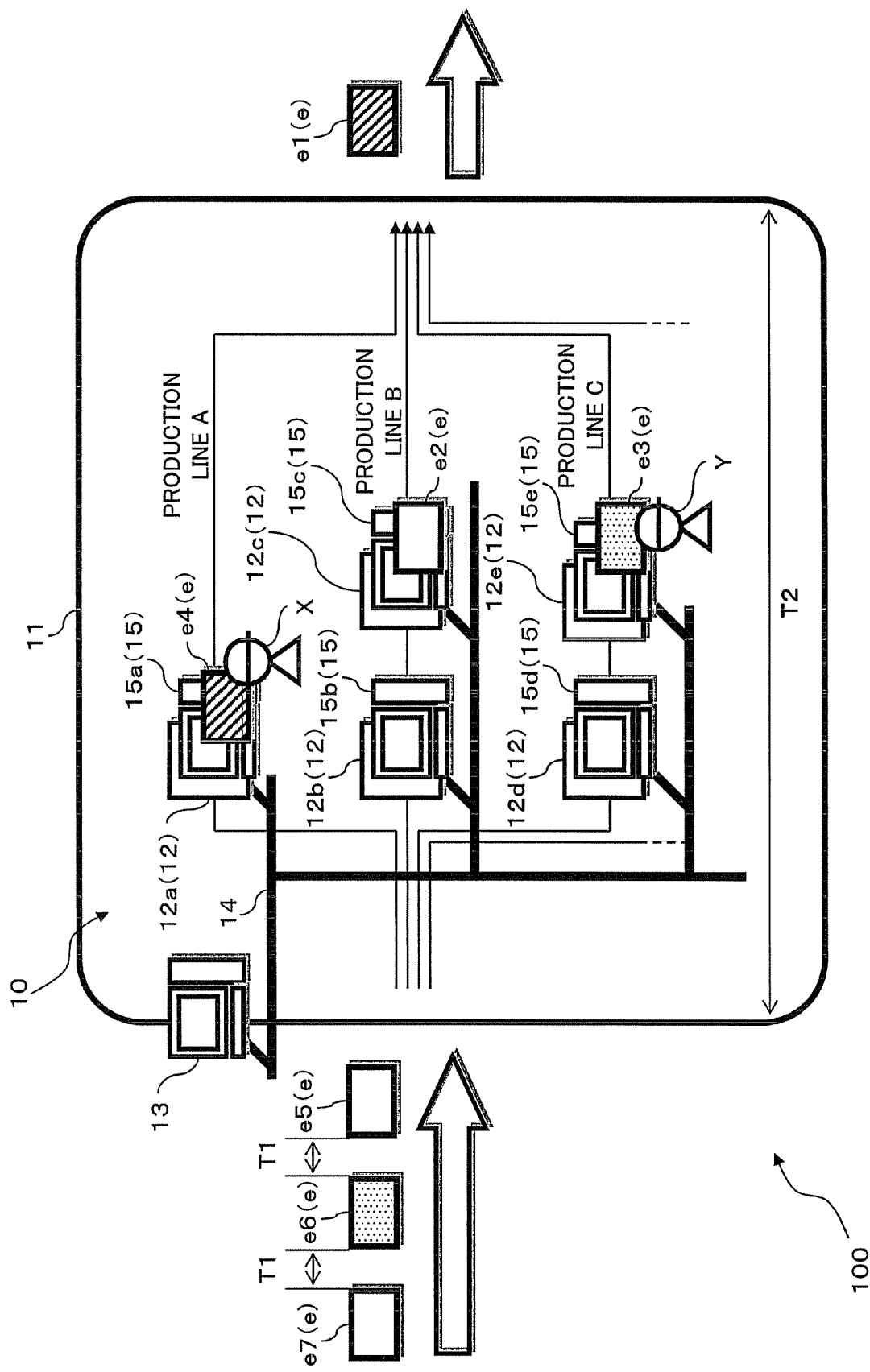
FIG. 1 is a diagram illustrating an example of a production system including an operation instructing system according to a first embodiment of the present invention.

FIG. 1 illustrates a production system including an operation system according to a first embodiment of the present invention.

The production system 100 performs various kinds of processing on a number of kinds of production elements (products) e1-e7 successively entered into the system, and includes an operation instructing system 10 and an automatic machine process 11, as illustrated in FIG. 1.

The automatic machine process 11, exemplified by TPS (Toyota Production System), carries out mixed production on a number of production elements (products) e1-e7 not possessing regularity in kind. As depicted in FIG. 1, the automatic machine process 11 includes a number (three in the first embodiment) of production lines A, B, and C. The different-kinds of production elements e1-e7 (products before the entry) are successively entered into the automatic machine process 11 at the intervals of process cycle time T1 (to be detailed below), and each of the production elements e1-e7 is produced by either one of the lines A, B, and C. The production elements (products after the entry) underwent the production processing are successively ejected out of the automatic machine process 11.

Hereinafter, the reference numbers A, B, and C are used when one of a number of production lines needs to be discriminated from the remaining lines, but an arbitrary production line is represented simply by the word "production line" without using a reference number. In addition, the reference numbers e1-e7 are used when one of a number of production elements needs to be discriminated from the remaining elements, but an arbitrary production element is represented by the reference symbol "e".

Here, the word "production" represents treatments, such as fabrication, processing, assembly, inspection, that are to be performed on a production element e, and hereinafter description will be made about a case the automatic machine process 11 makes processing on a production element e.

In the automatic machine process 11, the production element e entered into the system is processed in one of the production lines A, B, and C. In the first embodiment, the production element e1 and the production element e4 are processed in the production line A; the production element e2, the production element e5, and the production element e7 are processed in the production line B; and the production element e3 and the production element e6 are processed in the production line C.

The automatic machine process 11 sorts production elements e entered into the automatic machine process 11 to one of the production lines A, B, and C by the kinds of production elements e. In the first embodiment, the production element e1 and the production element e4 are sorted into the production line A; the production element e2, the production element e5, and the production element e7 are sorted into the production line B; and the production element e3 and the production element e6 are sorted into the production line C in accordance with the kinds of production elements e.

In addition, each of the production lines A, B, and C is equipped with one or more production machines (automatic machines) 12a-12e. In the example of FIG. 1, the production line A is equipped with a production machine 12a; the production line B is equipped with a production machine 12b and a production machine 12c; and the production line C is equipped with production machine 12d and a production machine 12e.

Hereinafter, the reference numbers 12a-12e are used when one of a number of production machines needs to be discriminated from the remaining machines, but an arbitrary production machine is represented by the reference number "12".

A production machine 12 processes a production element e. An operation process performed by the automatic machine process 11 consists of a number of unit processing steps (also called production steps or processing steps, see FIG. 4(b)) arranged in time series. The production machine 12 has already known to the public and description of the detailed configuration thereof is omitted here.

The unit processing step represents units of various processes (processing steps) to be performed by the production machine 12 which steps are sorted by the contents of the steps, that is a manual step (manual operation) performed by the operator per se., such as setups, and an automatic process (automatic operation) in which processing is carried out automatically. In each production line, manual steps and automatic steps are mixed in time series as the unit processing steps.

In the automatic machine process 11, a number of operators X and Y split up to take over respective different manual steps. In other words, in the automatic machine process 11, the operator do not carry out a single manual step in cooperation with each other, and therefore while one operation is carrying out a manual step, the other operator carries out a different manual step.

Next, description will be made in relation to the operation instructing system 10 of the first embodiment of the present invention.

Figure 2:
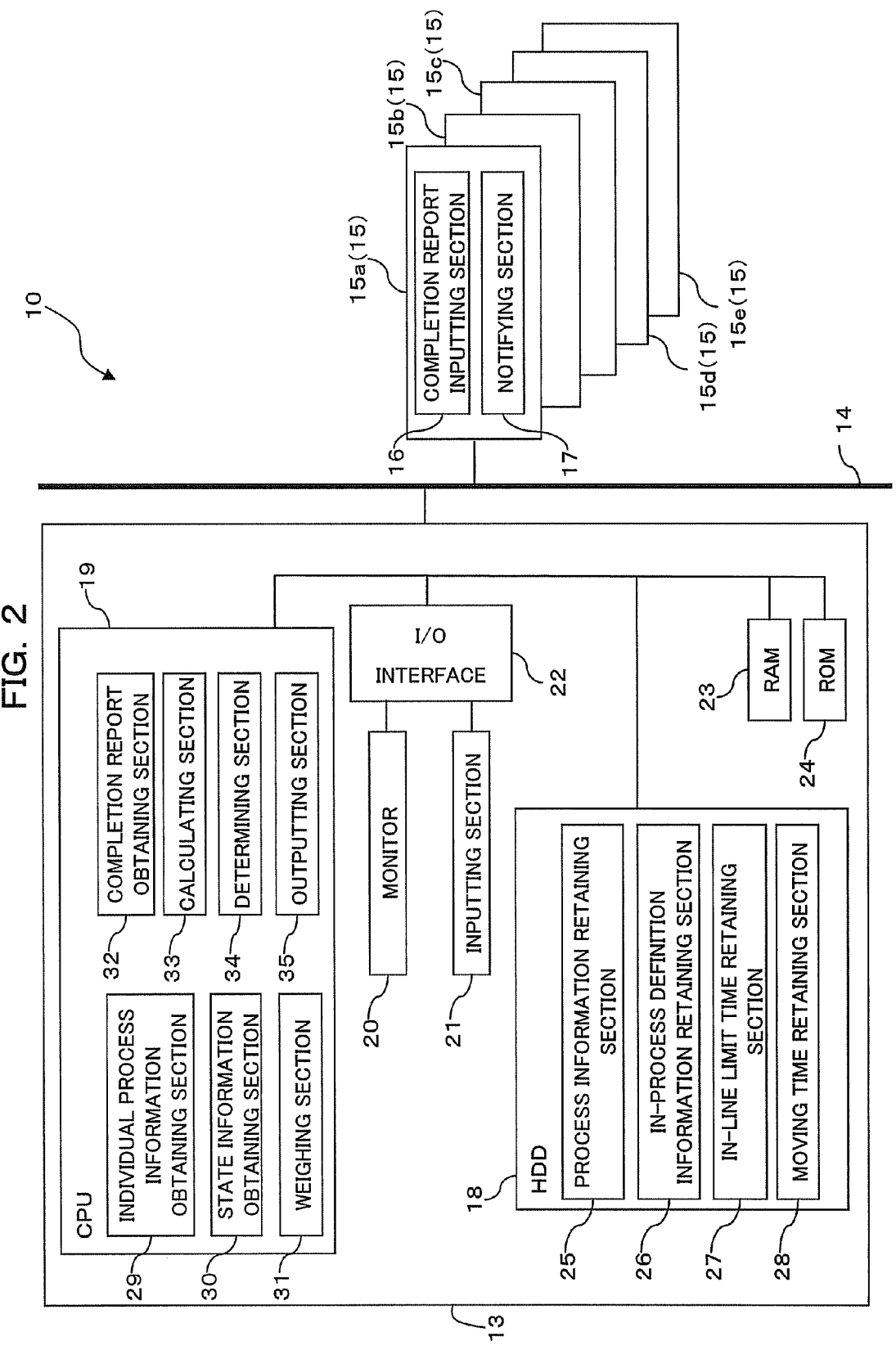
FIG. 2 is a diagram schematically illustrating an example of an operation instructing system of the first embodiment.

FIG. 2 is a diagram schematically illustrating an example of the configuration of the operation instructing system of the first embodiment of the present invention.

The operation instructing system 10 of the first embodiment notifies the operators X and Y of manual steps that the operators should take over next. As illustrated in FIGS. 1 and 2, the operation instructing system 10 includes an operation monitoring unit (operation instructing apparatus, monitoring controller) 13, and a number of terminals (operation instructing apparatus, automatic machine PC) 15a-15e connected to the operation monitoring unit 13 via communication lines 14 such as LAN (Local Area Network). The terminals 15a-15d are each associated one with the production machines 12a-12d: in the example of FIG. 1, the terminal 15a is associated with the production machine 12a; the terminal 15b is associated with the production machine 12b; the terminal 15c is associated with the production machine 12c; the terminal 15d is associated with the production machine 12d; and the terminal 15e is associated with the production machine 12e.

Hereinafter, the reference numbers 15a-15e are used when one of a number of terminals needs to be discriminated from the remaining terminals, but an arbitrary terminal is represented by the reference number "15".

The terminal 15 inputs an operation completion report that represents that the operator has completed a manual step, and outputs the operation completion report to the operation monitoring unit 13. In addition, the terminal 15 notifies the operator who has completed the manual step of the next operation step that is the manual step that the operator should carry out next. The terminal 15 is configured in the form of a computer having a completion report inputting section 16 and a notifying section 17.

The completion report inputting section 16 inputs an operation completion report that notifies that the operator has completed a manual step and is equipped with, for example, a mouse and/or a keyboard. Upon completion of an operation, the operator inputs the repot through the use of the mouse and/or the keyboard.

Further, the terminal 15 may be communicably connected to a production machine 12, so that the terminal 15 obtains a status (operation completion report) of the production machine 12 in real time from the production machine. In this case, the communicably connection to the production machine 12 functions as the completion report inputting section 16.

The operation completion report input by the completion report inputting section 16 is output to the operation monitoring unit 13.

The notifying section 17 notifies the operator who has completed a manual step of the next operation step determined by a determining section 34 that is to be detailed below.

For example, upon output information about the next operation step from an operation monitoring unit 13 that is to be detailed below, the notifying section 17 displays the information about the next operation step on the monitor so that the operator who has completed a manual step on the production machine 12 can confirm the next operation step that the operator should perform next by eye.

FIG. 2 omits the completion report inputting sections 16 and the notifying sections 17 of the terminals 15b-15e for the convenience.

The operation monitoring unit 13 manages individual steps of the production machines 12a-12d via the terminals 15a-15d, and specifically for example, upon reception of the operation completion report from one of the terminals 15a-15e, the operation monitoring unit 13 analyzes what operation the operator should take over next.

The operation monitoring unit 13 is configured in the form of a computer equipped with, as depicted in FIG. 2, a HDD (Hard Disk Drive) 18, a CPU (Central Processing Unit) 19, a monitor 20, an inputting section 21, an I/O interface 22, a RAM (Random-Access Memory) 23, and a ROM (Read-Only Memory) 24. The operation monitoring unit 13 accomplishes various functions to be detailed below by the CUP 19 executing the OS (operating System) and various program (operation instructing program) stored in the HDD 18. In other words, the HDD 18 stores therein also the OS and the programs.

The HDD 18 is a unit in which various information pieces are stored, and functions as, as depicted in FIG. 2, an process information retaining section 25, an in-process definition information retaining section 26, an in-line limit time retaining section 27, and a moving time retaining section 28.

Figure 3:
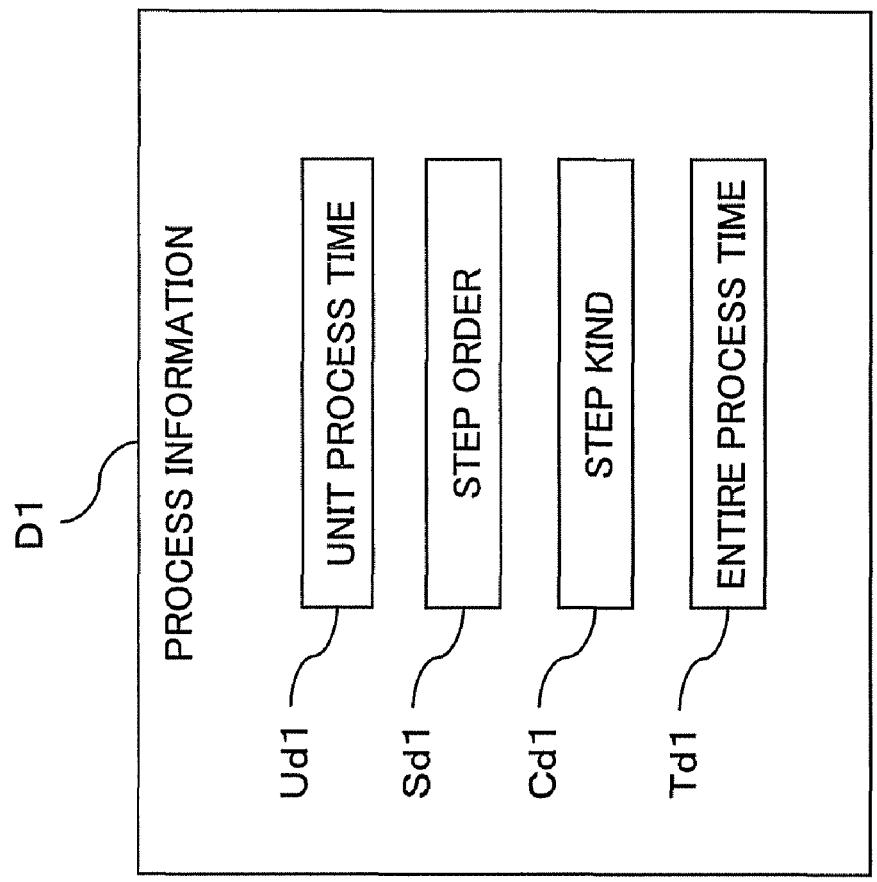
FIG. 3 is a diagram schematically depicting process information retained in a process information regaining section of the operation instructing system of the first embodiment.

FIG. 3 schematically depicts process information retained in a process information regaining section of the operation instructing system of the first embodiment; FIG. 4(a) depicts the process information arranged for respective production lines; and FIG. 4(b) depicts an example of the unit process time of the process information.

The process information retaining section 25 previously retains pieces of process information D1 about the processing steps in the production line, each piece for the production lines A, B, and C.

Hereinafter, the combination of a reference number D1 and the reference number A, B, or C representing a production line that comes after the D1 via a hyphen "-" represents process information of the corresponding production lines A, B, or C. In the example of FIG. 4(a) the process information of the production line A is represented by D1-A; the process information of the production line B is represented by D1-B; and the process information of the production line C is represented by D1-C. Hereinafter, a reference numbers D1-A, D1-B, and D1-C are used when one pieces of the process information needs to be discriminated from the remaining pieces, but an arbitrary piece of the process information is represented by a reference number D1.

The process information D1 is information about all the unit processing step constituting the operation process in a production machine 12 that forms a production line. When a single production line is equipped with a number of production machines 12, the process information D1 contains all the unit processing step constituting the operation processes in the respective production machines 12.

In the example of FIG. 4(a), process information D1-A represents all the unit processing steps constituting the operation process of the production machine 12a because the production lines is equipped with a single production machine 12a; process information D1-B represents all the unit processing steps constituting the operation process of the production machine 12b and all the unit processing steps constituting the operation process of the production machine 12c because the production lines is equipped with two production machine 12b and 12c; and process information D1-C represents all the unit processing steps constituting the operation process of the production machine 12d and all the unit processing steps constituting the operation process of the production machine 12e because the production lines is equipped with two production machine 12d and 12e.

The process information D1 includes, for example, unit process time Ud1, step order Sd1, step kind Cd1, and entire process time Td1, as depicted in FIG. 3. Besides the unit process time Ud1, the step order Sd1, the step kind Cd1, and the entire process time Td1, the process information D1 includes pieces of information about the kind of and the number of production machines constituting the production line, which are omitted in the drawings and the description of which is also omitted for the sake of convenience.

Hereinafter, the combination of a reference number Ud1 representing unit process time and the reference number A, B, or C representing a production line that comes after the Ud1 via a hyphen "-" represents unit process time of the corresponding production lines A, B, or C. The example of FIG. 4(b) depicts unit process time Ud1-C of the production line C. Hereinafter, the reference number like Ud1-C is used when one of a number of unit process times needs to be discriminated from the remaining unit process times, but an arbitrary unit process time is represented by the reference number "Ud1".

Hereinafter, the combination of a reference number Td1 representing an entire process time and the reference number A, B, or C representing a production line that comes after the Td1 via a hyphen "-" represents the entire process time of the corresponding production lines A, B, or C. In the example of FIG. 4(a), Td1-A represents the entire process time of the production line A; Td1-B represents the entire process time of the production line B; and Td1-C represents the entire process time of the production line C. Hereinafter, the reference numbers Td1-A, Td1-B, and Td1-C is used when one of a number of entire process times needs to be discriminated from the remaining entire process times, but an arbitrary unit process times is represented by the reference number "Td1".

The unit process time Ud1 represents a requisite time (process time) required for each of unit processing steps constituting the operation process performed in a single production line. For example, as illustrated in FIG. 4(b), all the unit processing steps constituting of the operation process of the production machine on the production line C take 1.3 minutes for the first manual step; 1.8 minutes for the first automatic step; 0.7 minutes for the second manual step; 4.1 minutes for the second automatic step; and 2.1 minutes for the third manual step, and these requisite times are regarded as the unit process time Ud1-C.

The example of FIG. 4(b) denotes the unit process time Ud1-C only for the production machine 12e, but the unit process time Ud1 is set for each of the remaining production machines 12a-12d, the drawings of which are however omitted for the sake of convenience.

The step order Sd1 represents information of the time-series order of the processing steps constituting the operation process in a single production line. The step kind Cd1 represents kinds of unit processing steps constituting the operation process of a single production line and is information to specify either a "manual step" or an "automatic step".

According to the example of FIG. 4(a), the process information D1-A represents that the unit processing steps of the production machine 12a is carried out in order of the first manual step, the first automatic step, the second manual step, the second automatic step, and the third manual step; the step order Sd1 represents the order of performing these unit processing steps; and the step kind Cd1 represents whether each of the unit processing steps is a manual operation or an automatic operation. Similarly, the process information D1-B represents that the unit processing steps of the production machine 12b is carried out in order of the first manual step, the first automatic step, the second manual step, the second automatic step, and the third manual step; and subsequently the unit processing steps of the production machine 12c in order of the first manual step, the first automatic step, and the second manual step; the step order Sd1 represents the order of performing these unit processing steps; and the step kind Cd1 represents whether each of the unit processing steps is a manual operation or an automatic operation. Further, the process information D1-C represents that the unit processing steps of the production machine 12d is carried out in order of the first manual step, the first automatic step, and the second manual step; and subsequently the unit processing steps of the production machine 12e in order of the first manual step, the first automatic step, the second manual step, the second automatic step, and the third manual step; the step order Sd1 represents the order of performing these unit processing steps; and the step kind Cd1 represents whether each of the unit processing steps is a manual operation or an automatic operation.

The entire process time Td1 represents the entire process time of a production line, and is specifically the total sum of requisite time periods for all the unit processing steps constituting the operation process of each production lines.

When a production line includes a single production machine 12, the entire process time Td1 represents the total time periods required for all the unit processing steps constituting the operation process of the production machine 12. In contrast, when a production line includes a number of production machines 12, the entire process time Td1 represents the sum of the total time periods required for all the unit processing steps constituting the operation processes of the respective production machines 12.

In the example of FIG. 4(a), the entire process time Td1-A of the production line A is 20 minutes that is the total requisite time periods (Ud1) for all the unit processing steps constituting the operation period of the production machine 12a. The entire process time Td1-B of the production line B is 22 minutes that is the sum of the total requisite time periods (Ud1) of 6 minutes for all the unit processing steps constituting the operation period of the production machine 12b and total requisite time period (Ud1) of 16 minutes for all the unit processing steps constituting the operation period of the production machine 12c. In addition, the entire process time Td1-C of the production line C is 12 minutes that is the sum of the total requisite time period (Ud1) of 2 minutes for all the unit processing steps constituting the operation period of the production machine 12d and total requisite time period (Ud1) of 10 minutes for all the unit processing steps constituting the operation period of the production machine 12e.

The in-process definition information retaining section 26 retains in-process definition information that should be defined in the automatic machine process 11 in advance. The in-process definition information previously retained is exemplified by the process cycle time T1 (see FIG. 1) representing intervals at which the production elements e1-e7 are successively input into the automatic machine process 11, and average stock number N (natural number) representing the number of production elements e existing in the automatic machine process 11. Hereinafter, the first embodiment is detailed on the assumption that the process cycle time T1 is 6 minutes commonly to the reproduction elements e (i.e., T1=6) and the average stock number N is three (i.e., N=3).

The in-line limit time retaining section 27 calculates an in-line limit time (production cycle time, a lead time in an automatic-machine process, cycle time) T2 based on the process cycle time T1 and the average stock number N retained in the in-process definition information retaining section 26.

The in-line limit time T2 is the limit of a time period (maximum time) for which a production line is allowed to take for a single production element e, as illustrated in FIG. 1, and obtained by multiplying the process cycle time T1 and the average stock number N (see formula (a)).

$$(T2)=(T1)\times(N) \quad (a)$$

In the first embodiment, on the basis of 6 minutes and three respectively determined to be the process cycle time T1 (T1=6) and the average stock number N (N=3), the in-line limit time T2 is calculated to be 18 minutes (6 minutes×three), which is retained in the in-line limit time retaining section 27.

Namely, the production elements e1-e7 are successively entered into the automatic machine process 11 at the constant intervals of the process cycle time T1, each of the production elements e1-e7 entered into the automatic machine process 11 is processed by one of the production lines A, B, and C and is successively ejected out of the automatic machine process 11 within the in-line limit time T2.

The moving time retaining section 28 previously retains the number of terminals 15 (or the number of production machines 12) and requisite moving times (definition of the distances between the automatic machines) Mt for the operators X and Y to move between the terminals 15. In the first embodiment, the moving time retaining section 28 previously retains the information to specify the routes between the terminals 15*a*-15*e* (or the production machines 12*a*-12*d*) and the moving times Mt required for an operator to move between the terminals 15*a*-15*e*.

Figure 5:
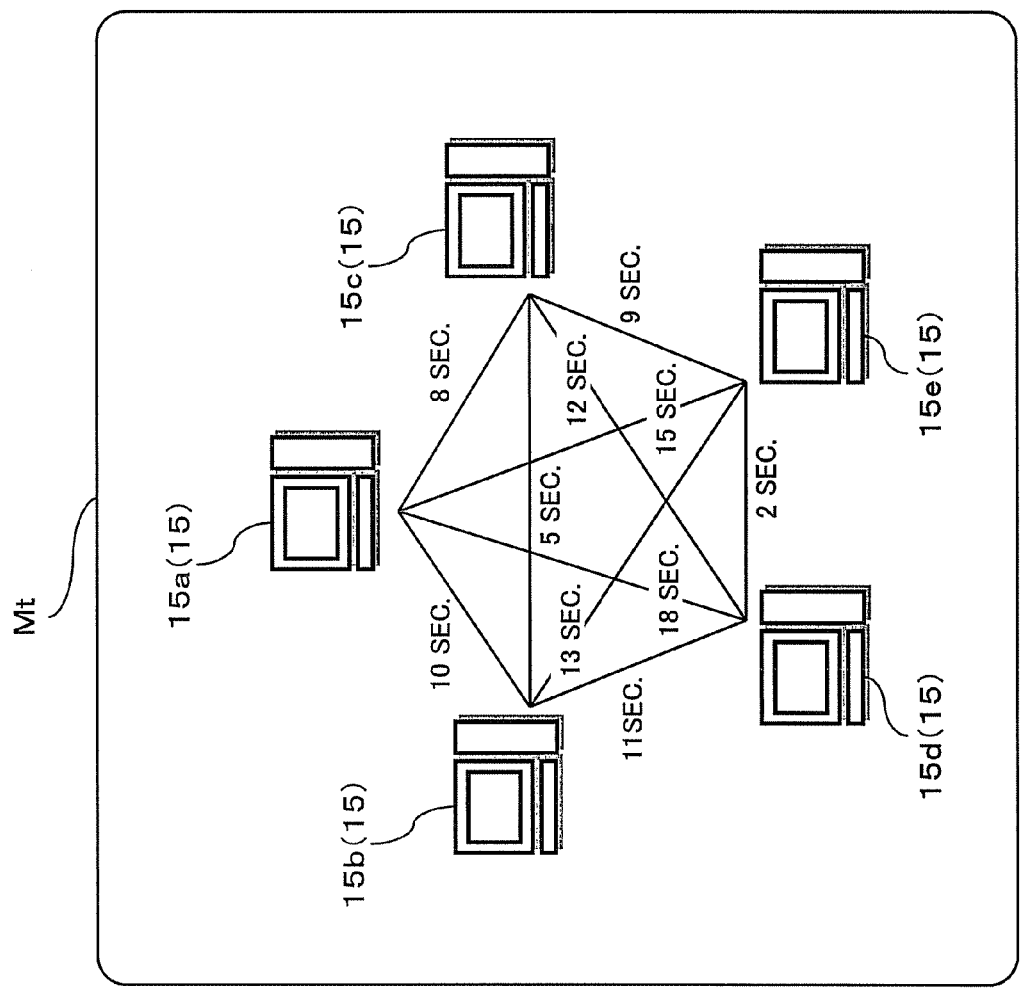
FIG. 5 is a diagram illustrating an example of moving time retained in a moving time retaining section of the operation instructing system of the first embodiment.

FIG. 5 is a diagram illustrating an example of the moving times retained in the moving time retaining section 28 of the operation instructing system according to the first embodiment of the present invention.

In the example of FIG. 5, the requisite moving time between the terminal 15*a* and the terminal 15*b* is 10 seconds; the requisite moving time between the terminals 15*a* and 15*c* is 8 seconds; the requisite moving time between the terminals 15*a* and 15*d* is 18 seconds; and the requisite moving time between the terminals 15*a* and 15*e* is 15 seconds.

In the example of FIG. 5, the moving time retaining section 28 retains moving times required to move between the terminals 15*b*-15*e* in addition to the requisite moving time between the terminal 15*a* and each of the terminals 15*b*-15*e*, but the further derailed description will be omitted for the sake of the convenience.

In other words, the moving time retaining section 28 retains the moving time Mt that required for the operators X and Y to move from a terminal 15 from which the operation completion report has been inputted to the terminal 15 associated with the production machine 12 where the next operation step is to be carried out.

The CPU 19 carries out, in the operation monitoring unit 13, various numeric calculation, information processing and control machines and devices. As illustrated in FIG. 2, the CPU 19 functions as an individual process information obtaining section 29, a state information obtaining section 30, a weighing section 31, a completion report obtaining section 32, a calculating section 33, a determining section 34, and an outputting section 35.

Figure 6:
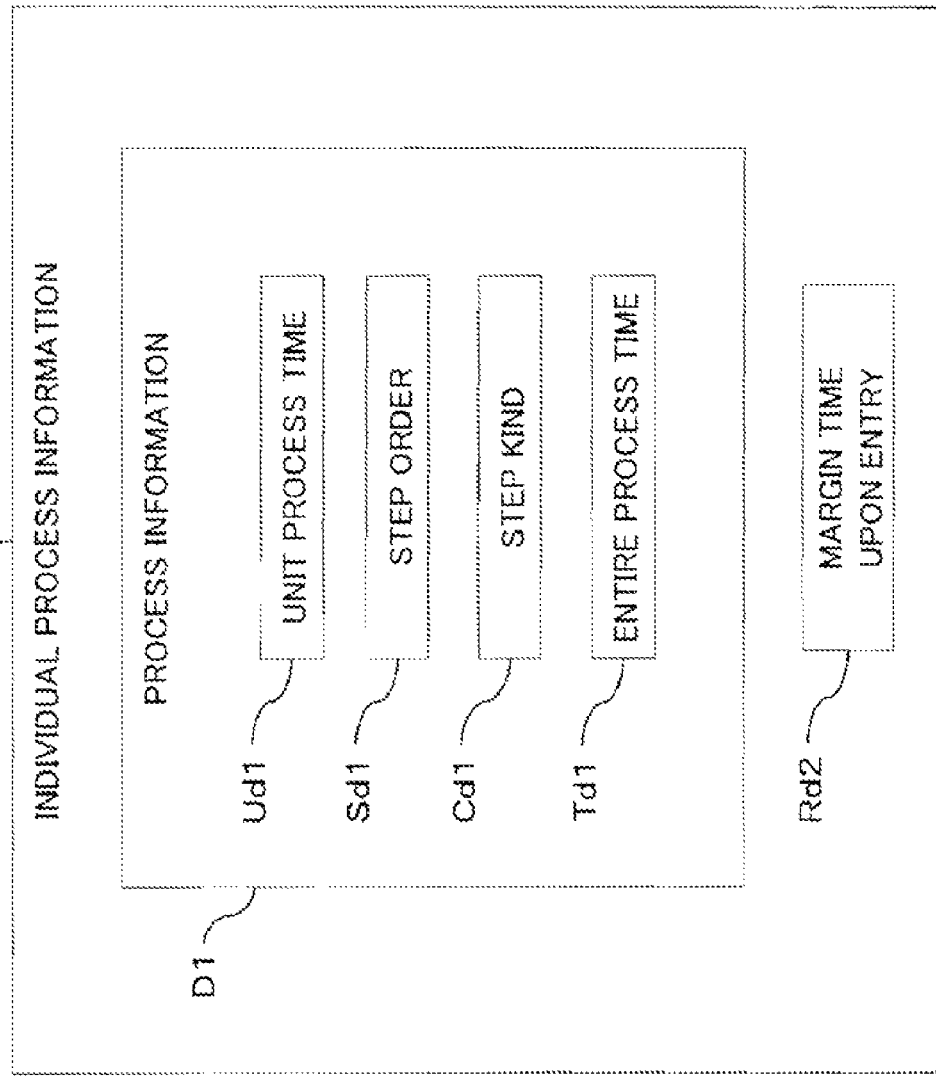
FIG. 6 is a diagram schematically illustrating an example of the configuration of individual process information obtained by an individual process information obtaining section of the operation instructing system of the first embodiment.
Figure 7:
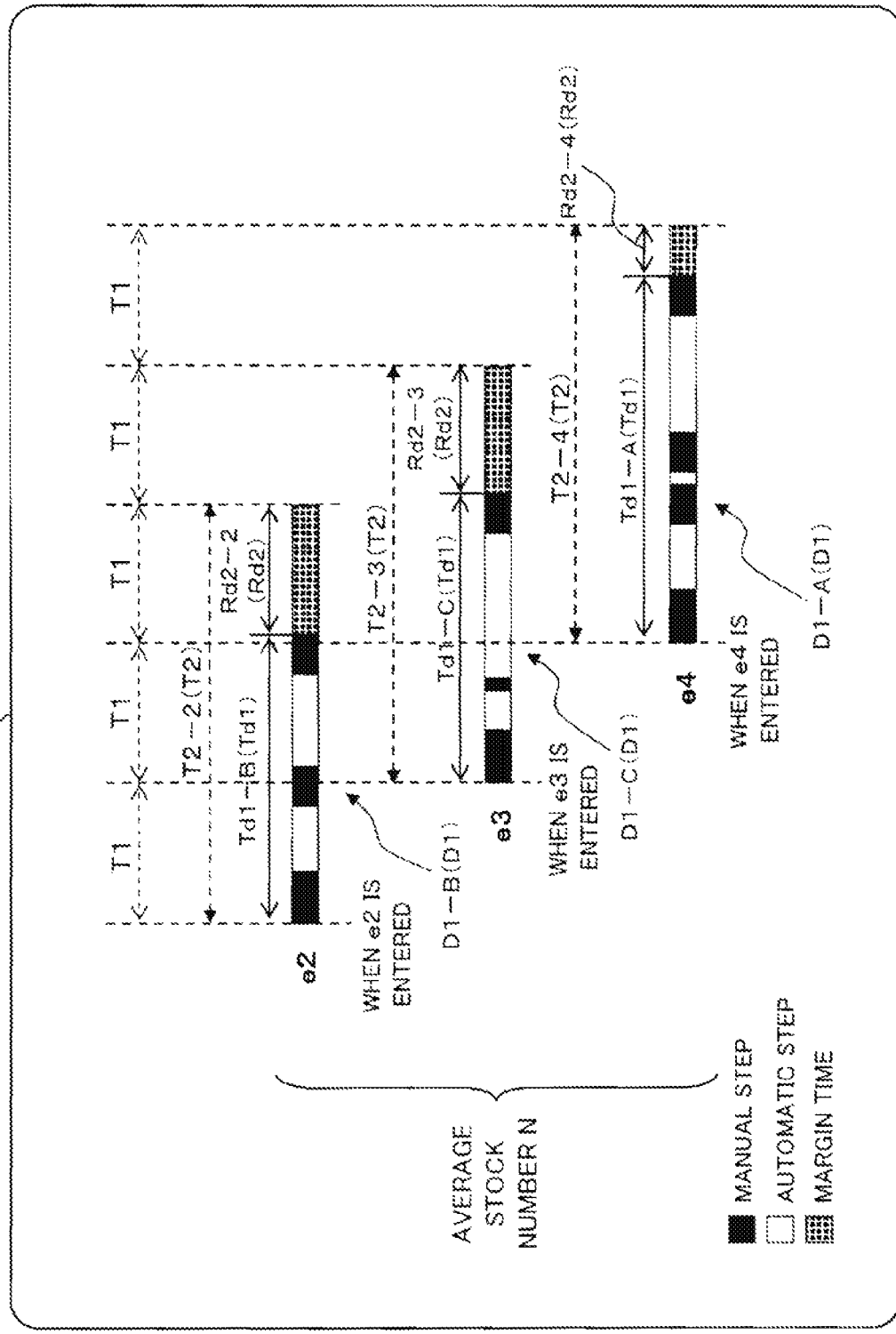
FIG. 7 is a diagram illustrating individual process information obtained by the individual information obtaining section of the operation instructing system of the first embodiment, which information is arranged for respective production elements in time series.

FIG. 6 schematically illustrates an example of the configuration of individual process information obtained by the individual process information obtaining section of the operation instructing system of the first embodiment of the present invention; and FIG. 7 illustrates individual process information obtained by the individual information obtaining section, which information is arranged for respective production elements in time series.

The individual process information obtaining section 29 generates and obtains, each time a production element e is entered into the automatic machine process 11, individual process information (entry information) D2 about the production line at which the production element e is processed automatic machine process 11.

Here, the individual process information D2 includes, as illustrated in FIG. 6, process information D1 and margin time Rd2 upon entry.

The process information D1 is process information (D1-A, D1-B, D1-C) of respective production lines (A, B, C) at which production elements e entered into the automatic machine process 11 are processed, and is D1-B for the process information of the production element e2 and the D1-A for the process information of the production element e3 in the example of FIG. 7.

The margin time Rd2 upon entry is a time period obtained by subtracting the entire process time Td1 in the process information D1 from the in-line limit time T2, and is Rd2-2 for the margin time upon entry of the production element e2, RD2-3 for the margin time upon entry of the production element e3, and RD2-4 for the margin time upon entry of the production element e4 in the example of FIG. 7.

Hereinafter, reference numbers Rd2-2, Rd2-3, and Rd2-4 are used when one of the margin times upon entry needs to be discriminated from the remaining margin times, but an arbitrary margin time upon entry is represented by reference number Rd2.

Similarly, the combination of a reference number T2 representing an in-line limit time and the reference number 2, 3, or 4 (hereinafter identification number 2, 3, or 4) representing the order of production element e that comes after the T2 via a hyphen "-" represents the in-line limit time corresponding to the production element e2, e3, or e4. In the present embodiment, the in-line limit time of the production element e2 is represented by T2-2; the in-line limit time of the production element e3 is represented by T2-3; and the in-line limit time of the production element e4 is represented by T2-4. These in-line limit times T2-2, T2-3, and T2-4 are the same.

Hereinafter, reference numbers T2-2, T2-3, and T2-4 are used when one of the in-line limit times needs to be discriminated from the remaining limit times, but an arbitrary in-line limit time is represented by reference number T2.

For example, when the production element e2 is entered into the automatic machine process 11 (see "when e2 is entered" in FIG. 7), the individual process information obtaining section 29 obtains process information D1-B concerning the production line B that is to process the production element e2 from the process information retaining section 25, and generates and obtains margin time Rd2-2 upon entry by subtracting the entire process time Td1-B of the production line B from the in-line limit time T2-2 obtained from the in-line limit time retaining section 27, as depicted in FIG. 7.

In addition, when the production element e3 is entered into the automatic machine process 11 (see "when e3 is entered" in FIG. 7), for example, the individual process information obtaining section 29 obtains process information D1-C concerning the production line C that is to process the production element e3 from the process information retaining section 25, and generates and obtains margin time Rd2-3 upon entry by subtracting the entire process time Td1-C of the production line C from the in-line limit time T2-3 obtained from the in-line limit time retaining section 27, as depicted in FIG. 7.

Still further, when the production element e4 is entered into the automatic machine process 11 (see "when e4 is entered" in FIG. 7), for example, the individual process information obtaining section 29 obtains process information D1-A concerning the production line A that is to process the production element e4 from the process information retaining section 25, and generates and obtains margin time Rd2-4 upon entry by subtracting the entire process time Td1-A of the production line A from the in-line limit time T2-4 obtained from the in-line limit time retaining section 27, as depicted in FIG. 7.

Hereinafter, the following description of the present embodiment assumes that the three production elements e2-e4 illustrated in FIG. 1 are present at the automatic machine process 11.

Figure 8:
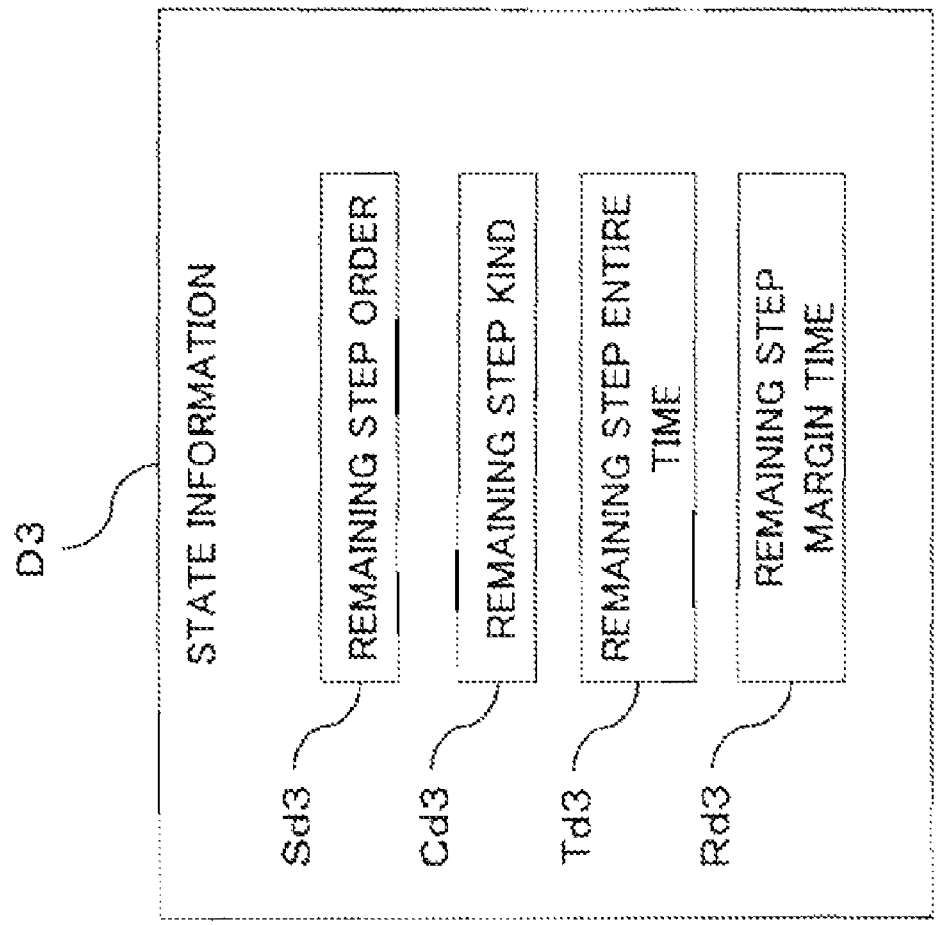
FIG. 8 is a diagram schematically illustrating an example of the configuration of state information obtained by a state information obtaining section of the operation instructing system of the first embodiment.
Figure 9:
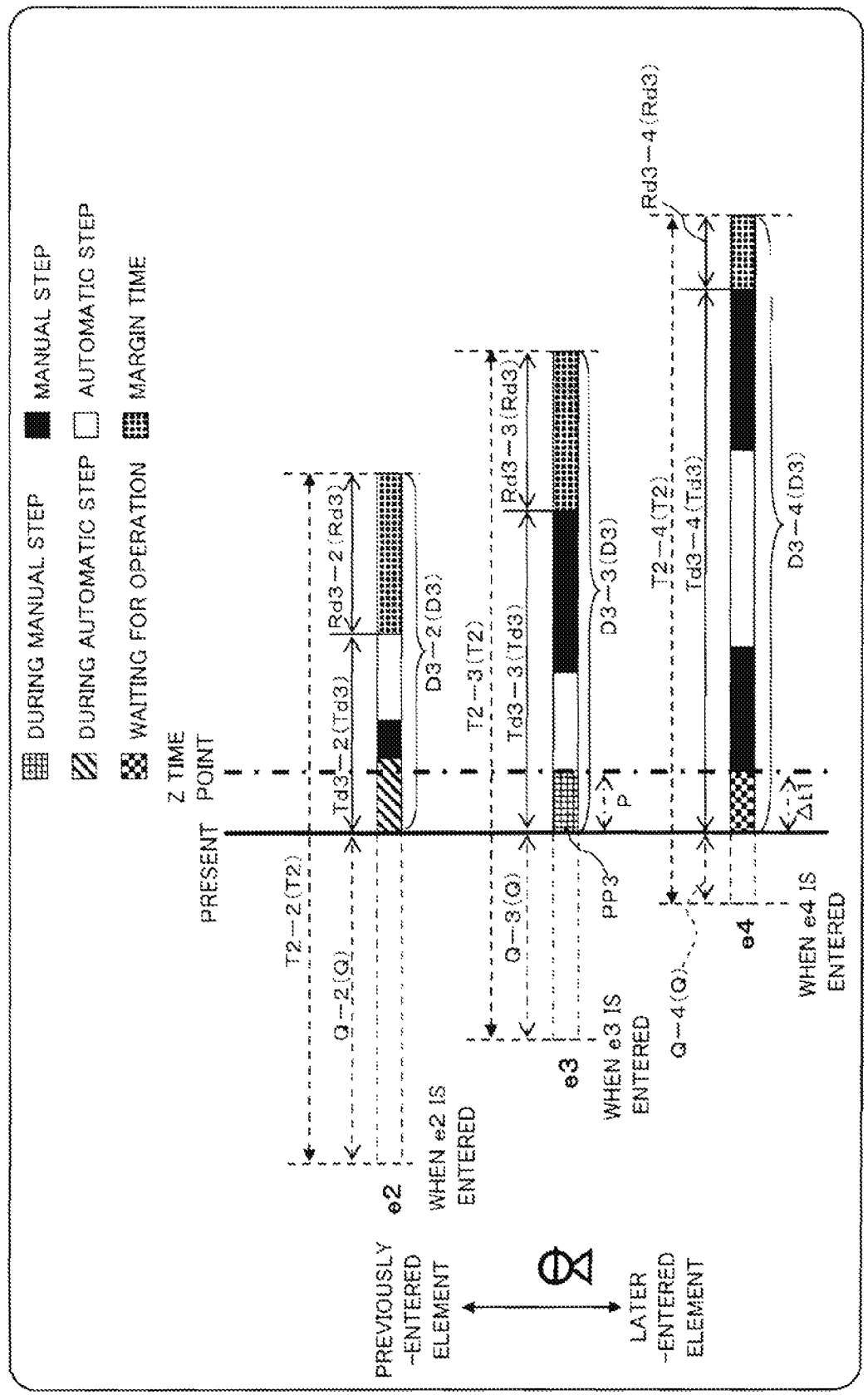
FIG. 9 is a diagram depicting the state information obtained by the state information obtaining section of the operation instructing system of the first embodiment of the present invention, which information is arranged for respective production elements.

FIG. 8 schematically illustrates an example of the configuration of state information obtained by the state information obtaining section of the operation instructing system of the first embodiment of the present invention. FIG. 9 illustrates the state information obtained by the state information obtaining section which information is arranged for the respective production elements.

The state information obtaining section 30 obtains respective pieces of state information D3 of the production elements e2-e4 currently in the automatic machine process 11 in real time on the basis of the individual process information D2 (process information D1) obtained by the individual process information obtaining section 29.

The respective pieces of state information D3 may be obtained from the operation monitoring unit 13 or from the terminals 15*a*-15*e*.

In the example of FIG. 9, D3-2 represents the state information D3 of the production element e2; D3-3 represents the state information D3 of the production element e3; and D3-4 represents the state information D3 of the production element e4. Further, in the example of FIG. 9, the order of entry of elements e into the automatic machine process 11 corresponds to the arrangement from the top to the bottom of the drawing.

Hereinafter, reference numbers D3-2, D3-3, and D3-4 are used when one or the pieces of the state information needs to be discriminated from the remaining pieces, but an arbitrary piece of the state information is represented by reference number D3.

The state information D3 is information about the remaining processing steps that are to be performed on a production element e, and includes, as depicted in FIG. 8, remaining step order Sd3, remaining step kind Cd3, remaining step entire time Td3, and remaining step margin time (margin time) Rd3. In addition to the remaining step order Sd3, the remaining step kind Cd3, the remaining step entire time Td3, and the remaining step margin time Rd3, the state information D3 includes information about the kind and the number of production machines constituting a production line and unit process time representing a requisite time period for each of the unit processing step constituting the operation process of a production line, the description of which is however omitted here for the sake of convenience.

The remaining step order Dd3 is information about the time-series order of the remaining unit processing steps that are to be performed on a production element e. The remaining step kind Cd3 is information about the kinds of remaining unit processing steps that are to be performed on the production element e, specifically information to specify one of "during a manual step" during an automatic step", "waiting for operation" for a unit processing step (hereinafter called the current unit step) currently being performed on the production element e, and information to specify either "a manual step" or "an automatic step" for each remaining step that is to be carried out after the current step.

Here, the term "during a manual step" represents a state in which an operator is carrying out a manual step (during an operation, during manual operation); and the term "during an automatic step" represents a state in which a production machine 12 is carrying out an automatic step (during automatically expediting, a state of automatically expediting). The term "waiting for operation" represents a state in which neither a manual step nor an automatic step is being carried out, and which is waiting for a manual step by an operator.

In the example of FIG. 9, the state information D3-2 indicates a state of during an automatic step and the remaining unit processing steps that are to be performed in the order of the first manual step and the first automatic step, which order of the unit processing steps is the step order Sd3. As to whether the current unit step is "during a manual step", "during an automatic step" or "waiting for operation" and as to whether each of the remaining unit step is "a manual step" and "an automatic step" are represented by the step kind Cd3. Similarly, the state information D3-3 indicates a state of during a manual step and the remaining unit processing steps that are to be performed in the order of the first automatic step and the first manual step, which order of the unit processing steps is the step order Sd3. As to whether the current unit step is "during a manual step", "during an automatic step" or "waiting for operation" and as to whether each of the remaining unit step is "a manual step" and "an automatic step" are represented by the step kind Cd3. Further, the state information D3-4 indicates a state of waiting for operation and the remaining unit processing steps that are to be performed in the order of the first manual step, the first automatic step, and a second manual step which order of the unit processing steps is the step order Sd3. As to whether the current unit step is "during a manual step", "during an automatic step" or "waiting for operation" and as to whether each of the remaining unit step is "a manual step" and "an automatic step" are represented by the step kind Cd3.

The remaining step entire time Td3 represents the entire time that the remaining steps to be performed on a production element e takes and is a sum of the remaining time of the current unit process and the requisite time of each of the remaining unit steps.

In the example of FIG. 9, the remaining step entire time Td3-2 of the production element e2 is the sum of the remaining time of the step currently during an automatic step and the requisite times for the first manual step and the first automatic step. The remaining step entire time Td3-3 of the production element e3 is the sum of the remaining time of the step currently during a manual step and the requisite times for the first automatic step and the first manual step. The remaining step entire time Td3-4 of the production element e4 is the sum of the remaining time of the step currently waiting for operation and the requisite times for the first manual step, the first automatic step, and the second manual step.

Hereinafter, the combination of a reference number Td3 representing a remaining step entire time and the identification number 2, 3, or 4 respectively representing the production elements e2, e3, and e4 that comes after the Td3 via a hyphen "-" represents the remaining step entire time corresponding to the production element e2, e3, or e4. In the example of FIG. 9, the remaining step entire time of the production element e2 is represented by Td3-2; the remaining step entire time of the production element e3 is represented by Td3-3; and the remaining step entire time of the production element e4 is represented by Td3-4. Hereinafter, reference numbers Td3-2, Td3-3, and Td3-4 are used when one of remaining step entire times needs to be discriminated from the remaining times, but an arbitrary remaining step entire time is represented by a reference number Td3.

The remaining step margin time Rd3 is obtained by subtracting the individual elapsed time Q and the remaining step entire time Td3 from the in-line limit time T2 of each production line retained in the in-line limit time retaining section 27. Here, an individual elapsed time Q represents time elapsed from entering the production element e to the present (present state) (see FIG. 9).

Here, the combination of a reference number Rd3 representing a remaining step margin time and the identification number 2, 3, or 4 respectively representing the production elements e2, e3, and e4 that comes after the Td3 via a hyphen "-" represents the remaining step margin time corresponding to the production element e2, e3, or e4. In the example of FIG. 9, the remaining step margin time of the production element e2 is represented by Rd3-2; the remaining step margin time of the production element e3 is represented by Rd3-3; and the remaining step margin time of the production element e4 is represented by Rd3-4. Hereinafter, reference numbers Rd3-2, Rd3-3, and Rd3-4 are used when one of remaining step margin times needs to be discriminated from the remaining times, but an arbitrary remaining step margin time is represented by a reference number Rd3.

Further, the combination of a reference symbol Q representing an individual elapsed time and the identification number 2, 3, or 4 respectively representing the production elements e2, e3, and e4 that comes after the symbol Q via a hyphen "-" represents the individual elapsed time corresponding to the production element e2, e3, or e4. In the example of FIG. 9, the individual elapsed time of the production element e2 is represented by Q-2; the individual elapsed time of the production element e3 is represented by Q-3; and the individual elapsed time of the production element e4 is represented by Q-4. In addition, a reference symbol Q-2, Q-3, or Q-4 is used when one of the individual elapsed times needs to be discriminated from the remaining elapsed times, but an individual elapsed time is represented by reference symbol Q.

In the example of FIG. 9, the remaining step margin time Rd3-2 concerning the production element e2 is obtained through subtracting the individual elapsed time Q-2 and remaining step entire time Td3-2 both of the production element e2 from the in-line limit time T2-2 of the production element e2; the remaining step margin time Rd3-3 concerning the production element e3 is obtained through subtracting the individual elapsed time Q-3 and remaining step entire time Td3-3 both of the production element e3 from the in-line limit time T2-3 of the production element e3; and the remaining step margin time Rd3-4 concerning the production element e4 is obtained through subtracting the individual elapsed time Q-4 and remaining step entire time Td3-4 both of the production element e4 from the in-line limit time T2-4 of the production element e4.

In the example of FIG. 9, the process on the production element e4 in the state of "waiting for operation" is not resumed at least after the completion of a manual step being performed on the production element e3, so that the start of the first manual step on the production element e4 is delayed for a time period P that the manual step on the production element e4 will take to be completed from the present. Consequently, the state information obtaining section 30 calculates the remaining step margin time Rd3-4 through a subtraction using the time P for which the start of the first manual step delays as the delay time $\Delta t1$.

The weighing section 31 applies weights to the remaining step margin times Rd3-2, Rd3-3, and Rd3-4 of the production elements e2-e4 in the automatic machine process 11 each time a production element e is entered into the automatic machine process 11. The example of FIG. 9 illustrates the order of entry of production elements into the automatic machine process 11 from the top to the bottom of the drawing, and the remaining step margin time Rd3-2 of the production element e2 (sometimes called the previously-entered) that has been entered the first to the remaining step margin time Rd3-4 of the production element e4 (hereinafter called the later-entered element) that has been entered the last are weighed with respective different weights (weight values $\alpha$, $\beta$, and $\gamma$) which successively increase. These weights $\alpha$, $\beta$, and $\gamma$ are multiplied by respective corresponding remaining step margin times Rd3-2, Rd3-3, and Rd3-4. The weighs $\alpha$, $\beta$, and $\gamma$ can be arbitrarily varied in accordance with the preferences of the production elements e or the like.

Specifically, when the production element e4 is entered into the automatic machine process 11, for example, the weighing section 31 multiplies "1" as the weight value a by the remaining step margin time Rd3-2 of the production element e2 that has been entered the first; multiplies "2" as the weight value $\beta$ by the remaining step margin time Rd3-3 of the production element e3 that has been entered the second; and multiplies "3" as the weight value $\gamma$ by the remaining step margin time Rd3-4 of the production element e4 that has been entered the last. In other words, the weighing section 31 provides the remaining step margin time Rd3 of the production element e that has been entered the last with the largest weight.

The completion report obtaining section 32 obtains the operation completion report that represents the completion of a manual step by an operator, and in the present embodiment, obtains the operation completion report by receiving the report output from the completion report inputting section 16.

Figure 10:
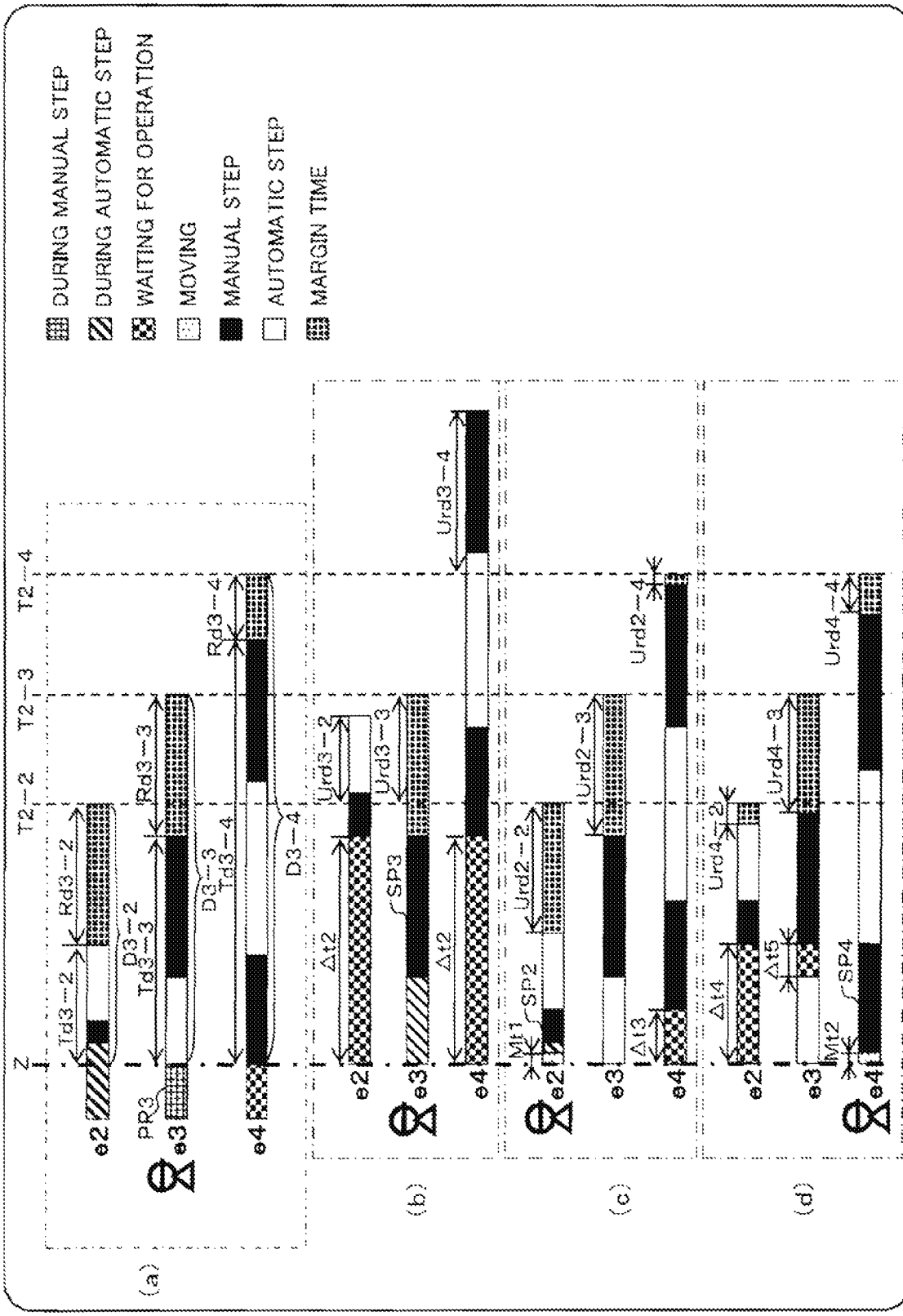
FIG. 10(a) is a diagram denoting the functions of a calculating section and a determining section of the operation instructing system of the first embodiment and depicting a state after the predetermined time period from the current process depicted in FIG. 9.
FIG. 10(b) is a diagram illustrating a process in which a manual process for a production element e3 is assumed to be the candidate for the next process under the state of (a)
FIG. 10(c) is a diagram illustrating a process in which a manual process for a production element e2 is assumed to be the candidate for the next process under the state of (a)
FIG. 10(d) being a diagram illustrating a process in which a manual process for a production element e4 is assumed to be the candidate for the next process under the state of (a)

FIGS. 10a-10d denotes the functions of the calculating section and the determining section of the operation instructing system of the first embodiment of the present invention: FIG. 10(a) depicts a state after the predetermined time period from the current process depicted in FIG. 9; FIG. 10(b) illustrates a process in which a manual step for the production element e3 is assumed to be the candidate for the next process under the state of (a); FIG. 10(c) illustrates a process in which a manual step for the production element e2 is assumed to be the candidate for the next process under the state of (a); and FIG. 10(d) illustrates a process in which a manual step for the production element e4 is assumed to be the candidate for the next process under the state of (a).

The calculating section 33 calculates an estimated entire margin time Trd on the basis of the state information D3 obtained by the state information obtaining section 30 each time the completion report obtaining section 32 obtains an operation completion report.

The calculating section 33 successively assumes that respective manual steps that can be the next operation step to be carried out by the operator are candidates for the next operation, and calculates estimated unit margin times (margin time) Urd2 through Urd4 of the respective production element e2 through e4 present in the automatic machine process 11 on each of the above assumptions, so that the sum of the estimated unit margin times Urd2 through Urd4 are calculated to serve as an estimate entire margin time Trd. In addition, the calculating section 33 successively assumes each undone manual steps SP2 to SP4 that should be carried out in the first place of the production elements e2 to e4 in the automatic machine process 11 to be the candidate for the next operation. At this time, the calculating section 33 excludes a manual step that another operator is carrying out (during operation) from the candidates for the next operation.

FIG. 10(a) represents a state at a Z time point elapsed from the current process of FIG. 9. Here, the Z time point illustrated in FIG. 10(a) is the time an operator completes the manual step PP3, which has been "during the manual step" on the production element e3 by an operator.

Hereinafter, the calculating section 33 and the determining section 34 of the present invention will now be described with reference of the example of the Z time point of FIG. 10(a).

For example, when the completion report obtaining section 32 obtains an operation completion report concerning the manual step PP3 which has been during a manual step on the production element e3, the calculating section 33 assumes the manual step SP3 which has not been done but which should be done in the first place for the production element e3 to be a candidate for the next operation (see FIG. 10(b)); assumes the manual step SP2 which has not been done but which should be done in the first place for the production element e2 to be a candidate for the next operation (see FIG. 10(c)); or assumes the manual step SP4 which has not been done but which should be done in the first place for the production element e4 to be a candidate for the next operation (see FIG. 10(d)). For these purposes, the calculating section 33 calculates the estimated entire margin times Trd3, Trd2, and Trd4.

Specifically, when the calculating section 33 assumes the manual step SP3 of the production element e3 to be the candidate for the next operation as illustrated in FIG. 10(b), for example, the calculating section 33 calculates estimated unit margin times Urd3-2, Urd3-3, and Urd3-4 respectively of the production elements e2, e3, and e4, and calculates the estimated entire margin time Trd3 by summing all the estimated unit margin times Urd3-2, Urd3-3, Urd3-4.

For example, when the manual step SP2 of the production element e2 is assumed to be a candidate for the next operation as illustrated in the example of FIG. 10(c), the calculating section 33 calculates estimated unit margin times Urd2-2, Urd2-3, and Urd2-4 respectively of the production elements e2, e3, and e4, and then calculates the estimated entire margin time Trd2 by summing the estimated unit margin times Urd2-2, Urd2-3, and Urd2-4.

Further for example, when the manual step SP4 of the production element e4 is assumed to be a candidate for the next operation as illustrated in the example of FIG. 10(d), the calculating section 33 calculates estimated unit margin times Urd4-2, Urd4-3, and Urd4-4 respectively of the production elements e2, e3, and e4, and then calculates the estimated entire margin time Trd4 by summing the estimated unit margin times Urd4-2, Urd4-3, and Urd4-4.

Hereinafter, the reference number Trd2, Trd3, or Trd4 is used when one of a number of estimated entire margin times needs to be discriminated from the remaining times, but an arbitrary estimated entire margin time is represented by the reference number Trd.

Similarly, the reference number of one from Urd2-2 to Urd2-4, Urd3-2 to Urd3-4, and Urd4-2 to Urd4-4 is used when one of a number of estimated unit margin times needs to be discriminated from the remaining margin times, but an arbitrary estimated unit margin time is represented by the reference number of corresponding one from Urd-2 to Urd-4.

The calculating section 33 incorporates the weights determined by the weighing section 31 and the moving time retained in the moving time retaining section 28 into calculation of the estimated entire margin time Trd.

For example, when the manual step SP3 of the production element e3 is assumed to be a candidate for the next operation as illustrated in the example of FIG. 10(b), steps for the production elements e2 and e4 come to be a state of "waiting for operation" during the time period from the Z time point to the completion of the manual step SP3 by the operator, and the time period being in a state of "waiting for operation" corresponds to a delay time $\Delta t2$. Therefore, these estimated margin times Urd3-2 and Urd3-4 of the production elements e2 and e4 are calculated by subtracting the delay time $\Delta t2$ from the remaining step margin times Rd3-2 and Rd3-4 (see FIG. 10(a)), respectively.

Accordingly, the estimated unit margin time Urd3-2 of the production element e2 becomes a negative value which means the time (operation delay) beyond the in-line limit time T2-2 of the production element e2 (see formula (b)).

$$(Urd3\text{-}2)=(Rd3\text{-}2)-(\Delta t2) \tag{b}$$

Similarly, the estimated unit margin time Urd3-4 of the production element e4 becomes a negative value which means the time (operation delay) beyond the in-line limit time T2-4 of the production element e4 (see formula (c)).

$$(Urd3\text{-}4)=(Rd3\text{-}4)-(\Delta t2) \tag{c}$$

The calculating section 33 sums values obtained through incorporating the weights $\alpha$, $\beta$, and $\gamma$ applied by the weighing section 31 respectively into the estimated unit margin times Urd3-2, Urd3-3, and Urd3-4 in order to calculate the estimated entire margin time Trd3 (see formula (d)).

$$(Trd3)=(Urd3\text{-}2)\times(\alpha)+(Urd3\text{-}3)\times(\beta)+(Urd3\text{-}4)\times(\gamma) \tag{d}$$

For example, when the manual step SP2 of the production element e2 is assumed to be a candidate for the next operation as illustrated in the example of FIG. 10(c), a step for the production elements e4 comes to be a state of "waiting for operation" during the time period from the Z time point to the completion of the manual step SP2 by the operator, and the time period in a state of "waiting for operation" corresponds to delay time $\Delta t3$. Therefore, the estimated margin time Urd2-4 of the production element e4 is calculated by subtracting the delay time $\Delta t3$ from the remaining step margin time Rd3-4 (see FIG. 10(a)), which means that the margin time of the production element e4 becomes less (see formula (e)).

$$(Urd2\text{-}4)=(Rd3\text{-}4)-(\Delta t3) \tag{e}$$

A step for the production element e3 does not have a delay time because the step is "during an automatic step" at the time point Z. Accordingly, the estimated unit margin time Urd2-3 of the production element e3 is the same value as the remaining step margin time Rd3-3 of the production element e3 (see FIG. 10(a)) (see formula (f)).

$$(Urd2\text{-}3)=(Rd3\text{-}3) \tag{f}$$

Further, a step for the production element e2 is "during an automatic step" at the time point Z, so that the moving time Mt1 caused by the operator's movement from the manual step PP3 to the manual step SP2 does not lead to occurrence of a delay time (FIG. 10(c) illustrates the moving time Mt1 overlaying the display of "during an automatic step"). Accordingly, the estimated unit margin time Urd2-2 for the production element e2 is the same value as the remaining step margin time Rd3-2 of the production element e2 (see FIG. 10(a)) (see formula (g)).

$$(Urd2\text{-}2)=(Rd3\text{-}2) \quad (g)$$

The calculating section 33 sums values, which have been obtained through incorporating the weights α, β, and γ provided by the weighing section 31 respectively into the estimated unit margin times Urd2-2, Urd2-3, and Urd2-4, in order to calculate the estimated entire margin time Trd2 (see formula (h)).

$$(Trd2)=(Urd2\text{-}2)\times(\alpha)+(Urd2\text{-}3)\times(\beta)+(Urd2\text{-}4)\times(\gamma) \quad (h)$$

Further, when the manual step SP4 for the production element e4 is assumed to be the next operation step as depicted in FIG. 10(d), the operator's movement from the manual step PP3 to the manual step SP4 generates the moving time Mt2, for which the start of the manual step SP4 is delayed (FIG. 10(d) illustrates the moving time Mt2 in front of display of the manual step SP4). Accordingly, the estimated unit margin time Urd4-4 for the production element e4 is the value obtained by subtracting the moving time Mt2 from the remaining step margin time Rd3-4 of the production element e4 (see FIG. 10(a)) (see formula (i)).

$$(Urd4\text{-}4)=(Rd3\text{-}4)-(Mt2) \quad (i)$$

A step for the production element e2 comes to be in a state of "waiting for operation" during the time period from the Z time point to the completion of the manual step SP4 by the operator, and the time period being in a state of "waiting for operation" corresponds to delay time Δt4. Therefore, the estimated margin time Urd4-2 of the production element e2 is calculated by subtracting the delay time Δt4 from the remaining step margin time Rd3-2 of the production element e2 (see FIG. 10(a)) (see formula (j)).

$$(Urd4\text{-}2)=(Rd3\text{-}2)-(\Delta t4) \quad (j)$$

Further, a step for the production element e3 comes to be in a state of "waiting for operation" during the time period from the completion of a step "during an automatic step" at the Z time point to the completion of the manual step SP4 by the operator, and the time period being in a state of "waiting for operation" corresponds to delay time Δt5. Therefore, the estimated margin time Urd4-3 of the production element e3 is calculated by subtracting the delay time Δt5 from the remaining step margin time Rd3-3 of the production element e3 (see FIG. 10(a)) (see formula (k)).

$$(Urd4\text{-}3)=(Rd3\text{-}3)-(\Delta t5) \quad (k)$$

The calculating section 33 sums values, which have been obtained through incorporating the weights α, β, and γ provided by the weighing section 31 respectively into the estimated unit margin times Urd4-2, Urd4-3, and Urd4-4, in order to calculate the estimated entire margin time Trd4 (see formula (l)).

$$(Trd4)=(Urd4\text{-}2)\times(\alpha)+(Urd4\text{-}3)\times(\beta)+(Urd4\text{-}4)\times(\gamma) \quad (l)$$

Each time the determining section 34 obtains an operation completion report from the completion report obtaining section 32, the determining section 34 determines a manual step that the operator who has completed a manual step should carry out next to be the next operation step on the basis of the estimated entire margin times Trd2 to Trd4 calculated by the calculating section 33, and specifically determines a candidate for the next operation associated with the maximum estimated entire margin time Trd among a number of estimated entire margin times Trd2-Trd4 calculated by the calculating section 33. In other words, the determining section 34 determines the next operation step on the basis of state information D3 obtained by the state information obtaining section 30.

In the example of FIGS. 10(a)-(d), the determining section 34 determines, to be the next operation step, the assumed manual step SP4 associated with the maximum estimated entire margin time Trd4, in which the weights applied by the weighing section 31 is incorporated, among from estimated entire margin times Trd2-Trd4 calculated by the calculating section 33.

As described above, it is possible to carry out risk management considering that the previously-entered with less remaining steps has a small risk to go beyond the in-line limit time T2 even when the margin time is running out while an element with many remaining steps has a large risk to go beyond the in-line limit time T2 when the margin time is running out.

The outputting section 35 outputs the next operation step determined by the determining section 34 to the notifying section 17 of a terminal 15. The notifying sections 17 notify the next operation step obtained by the outputting section 35 to either operator X or Y that has inputted the operation completion report.

The monitor 20 displays thereon various information pieces of the operation monitoring unit 13. The inputting section 21 inputs data and instruction contents into the operation monitoring unit 13 through inputs and other operations of the users or others, and is equipped with a mouse and/or a keyboard, for example.

The I/O interface 22 controls input/output devices such as the monitor 20 and the inputting section 21.

The RAM 23 temporarily expands and retains data and programs when the CPU 19 is carrying out various operation processes, and the ROM 24 retains programs and data that are to be executed or treated by the CPU 19.

Figure 11:
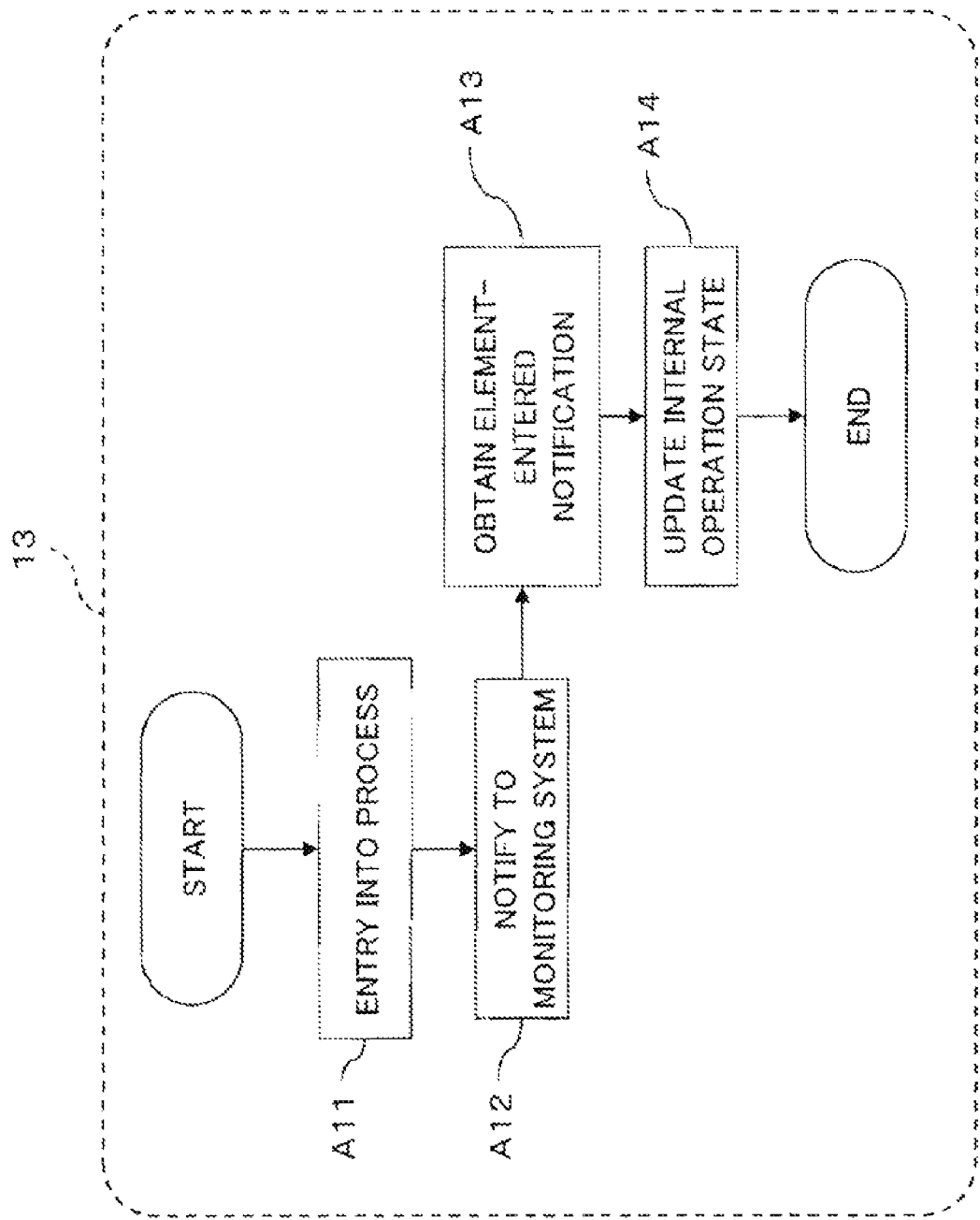
FIG. 11 is a flow diagram explaining a method for updating individual process information by an operation monitoring unit of the operation instructing system of the first embodiment.

Description will now be made in relation to a method for updating the individual process information D2 of the operation monitoring unit 13 of the operation instructing system 10 having the above configuration of the first embodiment of the present invention with reference to a flow diagram (steps A11 to A14) of FIG. 11.

The process information retaining section 25 retains process information D1 of each of a number of production lines in advance (the process information retaining step) and the moving time retaining section 28 retains the moving times Mt (the moving time retaining step). In addition, the in-line limit time retaining section 27 retains the in-line limit times T2 based on the in-process definition information retained in the in-process definition information retaining section 26 (the in-line limit time retaining step).

When a production element e is entered into the automatic machine process 11 (step A11), the automatic machine process 11 notifies the operation monitoring unit 13 that the production element e has been entered into the automatic machine process 11 (step A12).

Upon receipt of the notification of element entering from the automatic machine process 11 (step A13), the individual process information obtaining section 29 obtains process information D1 about the production line that is to carry out processing on the entered production element e, and generates the individual process information D2 of the same production element e (the individual process information obtaining step), so that the internal operation state of the operation monitoring unit 13 is updated (step A14, the internal process information updating step) to terminate the procedure.

Figure 12:
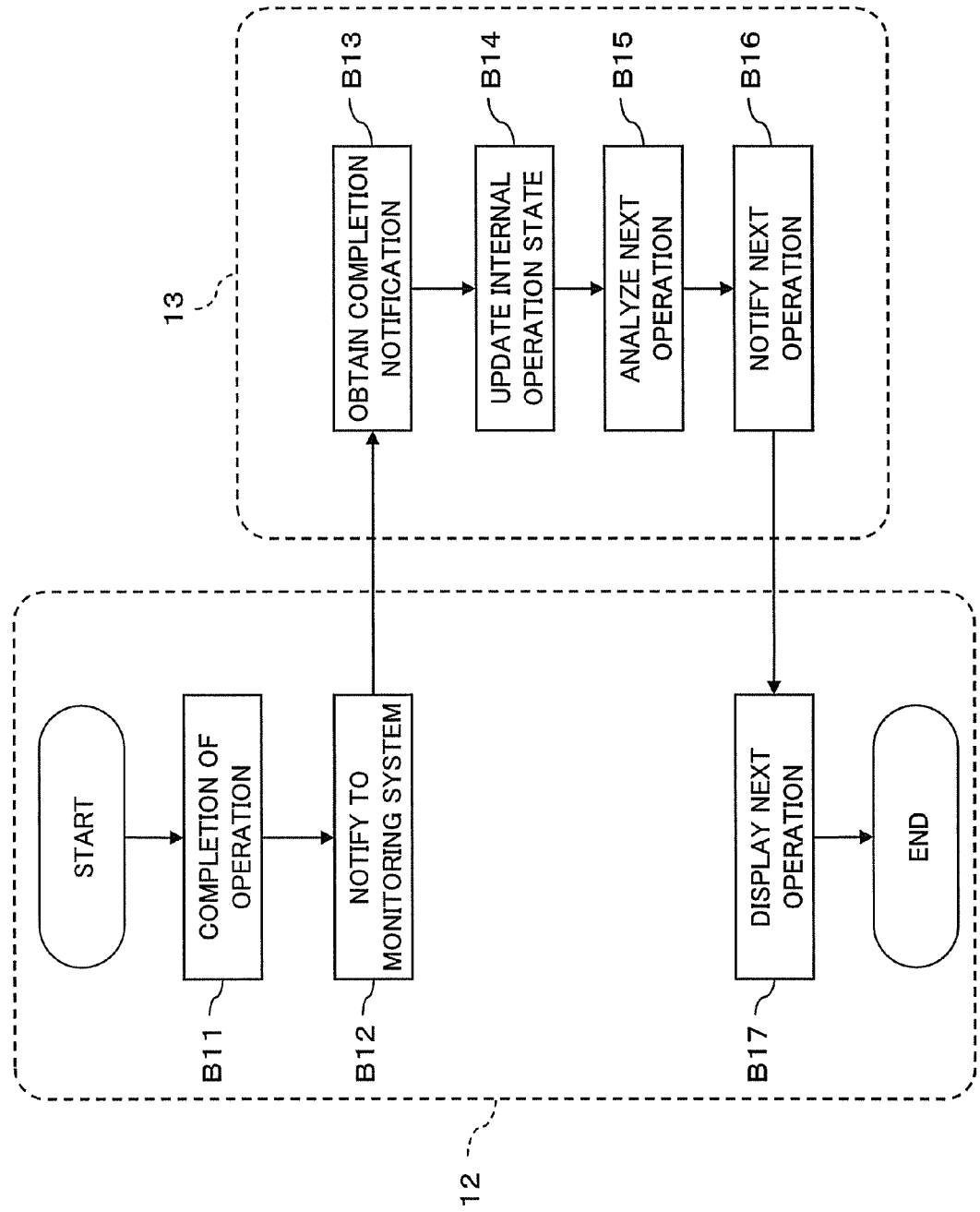
FIG. 12 is a flow diagram explaining a method for notifying the next step of the operation instructing system of the first embodiment.
Figure 13:
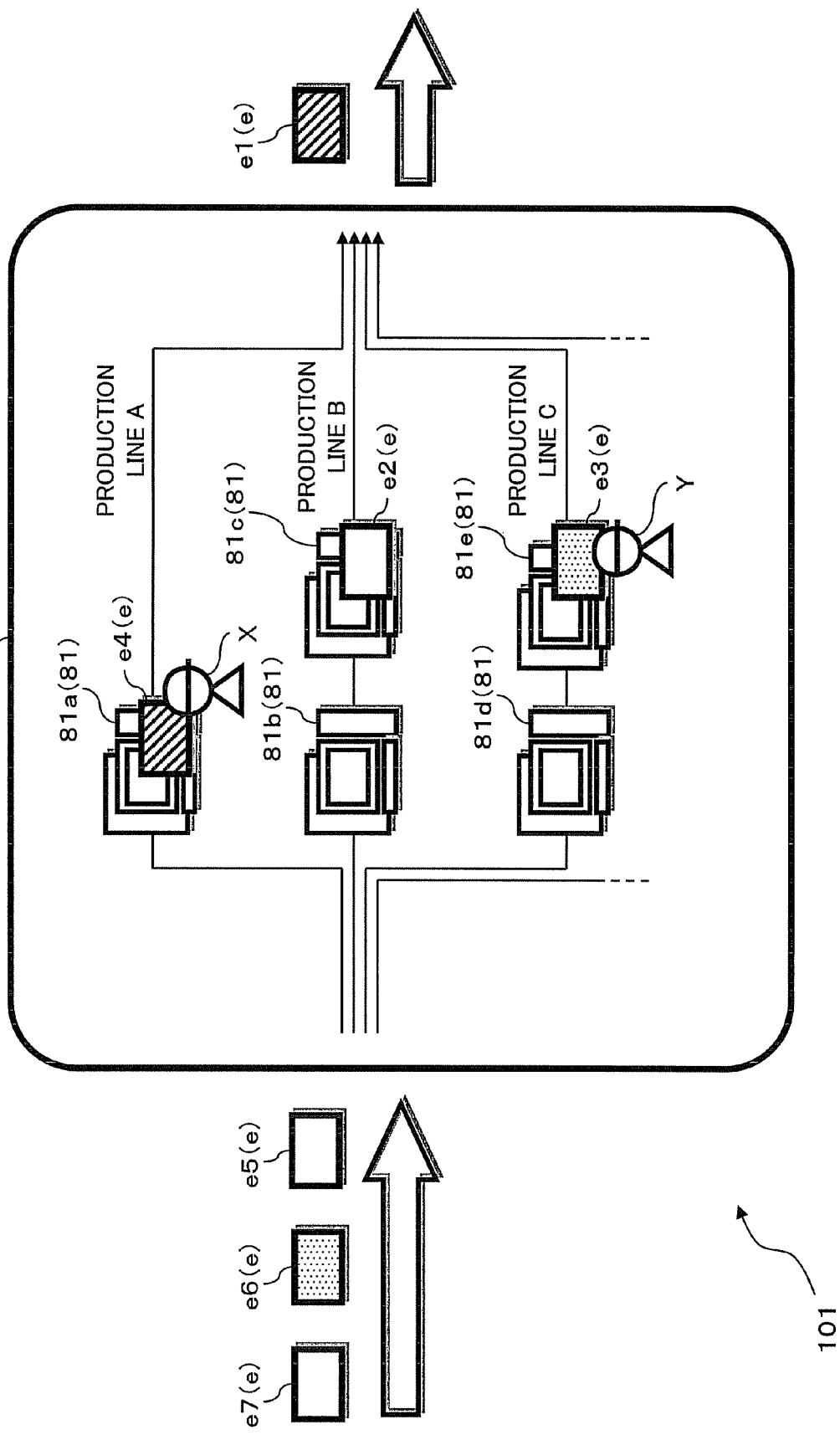
FIG. 13 is a diagram illustrating an example of the configuration of a conventional production system.

Next, description will now be made in relation to a method for notifying the next operation step in the operation instructing system 10 having the above configuration of the first embodiment with reference to a flow diagram (steps B11 to B17) of FIG. 12.

For example, the state information obtaining section 30 obtains the remaining step margin time Rd3 (state information D3) of each of a number of production elements e currently in the automatic machine process 11 in real time (the information obtaining step). For example, the weighing section 31 weighs the remaining step margin times Rd3 of the respective production elements e in the automatic machine process 11 (the weighing step) each time a production element e is entered into the automatic machine process 11.

Upon completion of a manual step (step B11), the operator inputs an operation completion report into the completion report inputting section 16.

Then the completion report inputting section 16 outputs (notifies) the operation completion report to the operation monitoring unit 13 (step B12), and the completion report obtaining section 32 obtains the operation completion report (step B13, the completion report obtaining step), so that the internal operation state of the operation monitoring unit 13 is updated (step B14).

When the completion report obtaining section 32 has obtained the operation completion report, the calculating section 33 successively assumes candidates for the next operation to be carried out in the automatic machine process 11 on the basis of the state information D3 obtained by the state information obtaining section 30, and calculates the estimated entire margin times Trd2-Trd4 by summing the estimated unit margin times Urd-2 to Urd-4 of the production elements e currently in the automatic machine process 11 (step B15, the calculation step). In the calculation of the estimated entire margin times Urd-2 to Urd-4, the weights applied by the weighing section 31 and the moving times Mt retained in the moving time retaining section 28 are considered.

When the estimated entire margin times Trd-2 to Trd-4 have been calculated, the determining section 34 determines a manual steps associated with the maximum estimated entire margin times among the calculated entire margin times Trd-2 to Trd-4 to be the next operation step (the determining step).

The outputting section 35 outputs the next operation step determined by the determining section 34 to the notifying section 17 of a terminal 15 at which the operation completion report has been input (step B16), and the notifying section 17 notifies the next operation step to the operator that has completed a manual step (step B17, the notifying step) to terminate the procedure. The procedure of the above steps B11-B17 are carried out each time the completion report obtaining section 32 obtains an operation completion report.

The operation instructing system 10 of the first embodiment of the present invention obtains state information D3-2, D3-3, and D3-4 representing remaining processing steps to be performed on respective production elements e2-e4 currently in the automatic machine process 11 and determines the next operation step on the basis of the obtained state information D3-2, D3-3, and D3-4 each time an operation completion report is received, so that an instruction of the next manual step can be notified to the operator that has completed a manual step in real time. Accordingly, even in cases where the preferences of preferential operations, a preferential automatic machine, and the previously-entered element randomly varies, it is possible to accurately notify the operator of the instruction of the next operation step, greatly increasing the production efficiency.

In addition, notification of the next operation process to the operator that has completed a manual step makes it possible to accurately notify instructions of operation steps to respective operators, avoiding redundancy in operation and further to clarify respective operators' shears of the operations, greatly increasing the production efficiency.

Further, since the remaining step margin times Rd3-2, Rd3-3, and Rd3-4 obtained by subtracting an individual elapsed time and an remaining step entire time Td3 from an in line limit time T2 are calculated to serve as the state information D3-2, D3-3, and D3-4 for respective production elements e2-e4 currently in the automatic machine process 11, the production efficiency can be greatly improved by accurately notifying instructions of next step to be carried out to the operators in consideration of the preference of an operation largely affects the in line limit time T2 and the preference of performing a manual step with less margin.

Each time a production element e is entered into the automatic machine process 11, the remaining step margin time Rd3-2, Rd3-3, and Rd3-4 of a number of production elements e2-e4 currently in the automatic machine process 11 are weighed, so that the production efficiency can be greatly improved by notifying an instruction of the operation step to be carried out the next to each operator in consideration of a preference to realize a manner of first-in first out.

In addition, the estimated entire margin times Trd2-Trd4 are calculated in consideration of the moving times Mt required for an operator to move between manual steps, so that the production efficiency can be greatly improved by notifying an instruction of the operation step to be carried out the next to each operator.

[2] Others:

The present invention should by no means be limited to the foregoing embodiment, and various changes and modifications can be suggested without departing from the gist of the present invention.

For example, in the above embodiment, the HDD 18 in the operation monitoring unit 13 serves to function as the process information retaining section 25, the in-process definition information retaining section 26, the in-line limit time retaining section 27, and the moving time retaining section 28. However, the present invention is not limited to this. Alternatively, a memory device connected via the communication line 14 or a known memory device other than an HDD may function as the process information retaining section 25, the in-process definition information retaining section 26, the in-line limit time retaining section 27, and the moving time retaining section 28.

In the above embodiment, an operation completion report is input into the completion report inputting section 16 from an operator, but the present invention is not limited to this. Alternatively, an operation completion report is automatically input into the completion report inputting section 16 when a manual step is completed.

Further in the above embodiment, the operation monitoring unit 13 starts analysis upon input an operation completion report from one of the terminals 15*a*-15*e*, but the present invention is not limited to this. Alternatively, the operation monitoring unit 13 may start analysis in response to an entry of a production element to the automatic machine process 11.

The CPU 19 of the operation monitoring unit 13 functions as the individual process information obtaining section 29, a state information obtaining section 30, a weighing section 31, a completion report obtaining section 32, a calculating section 33, a determining section 34, and an outputting section 35 in the operation instructing system 10 having the above configuration through executing the operation instructing program.

The program (the operation instructing program) to realize the functions of he individual process information obtaining section 29, a state information obtaining section 30, a weighing section 31, a completion report obtaining section 32, a calculating section 33, a determining section 34, and an outputting section 35 is provided in the form of being stored in a computer-readable recording medium, such as a flexible disk, a CD (e.g., CD-ROM, CD-R, CD-RW), and a DVD (e.g., DVD-ROM, DVD-RAM, DVD-R, DVD+R, DVD+RW). In such a case, the computer reads the operation instructing program from the recording medium and sends the read program to an internal or external memory to store for use. Further alternatively, the operation instructing program may be recorded in a memory device (a recording medium), such as a magnetic disk, an optical disk or a magneto-optical disk, and is provided to the computer from the memory device through a communication path.

Here, a computer is a concept of a combination of hardware and an OS and means hardware which operates under control of the OS. Otherwise, if an application program operates hardware independently of an OS, the hardware corresponds to the computer. Hardware includes at least a microprocessor such as a CPU and means to read a computer program recorded in a recording medium. In the first embodiment, the operation monitoring unit 13 has the function as a computer.

The application program serving as the above operation instructing program contains program codes to cause such an above computer to function as the individual process information obtaining section 29, a state information obtaining section 30, a weighing section 31, a completion report obtaining section 32, a calculating section 33, a determining section 34, and an outputting section 35. Further, a part of the functions may be realized by the OS, not by the application program.

The recording medium used in the first embodiment may be various computer-readable recording media such as an IC card, a ROM cartridge, a magnetic tape, a punch card, an internal storage unit (RAM or ROM) for a computer, an external storage unit, or a printing matter on which codes, such as bar codes, are printed, in addition to a flexible disk, a CD, a DVD, a magnetic disk, an optical disk and a magnet-optical disk above listed.

With reference to the disclosure of the embodiment of the present invention, those ordinarily skilled in the art can carry out and produce the present invention.

The present embodiment can be applied to various production systems including manual steps carried out by an operator, in addition to mixed production.

According to the present embodiment, state information about the remaining production steps that are to be carried out on a production element is obtained for each of the production elements currently in the production system and, each time an operation completion report is obtained, the next operation step is determined on the basis of the obtained state information. Consequently, it is possible to instruct an operator that has completed a manual step of the next manual step that the operator is to carry out next. With this configuration, even when the preferential operation, the preferential automatic machine and the operation degree of the first-put element randomly vary, accurate instructions of the next operation step to each operator can improve the production efficiency.

Notification of the next operation process to an operator that has completed a manual step makes it possible to accurately instruct a number of operators of respective operations, avoiding a case in which a single operation step is carried out by two or more operator. Therefore, clear definition of the operation shares of respective operators can improve the production efficiency.

Further, an ample time derived from subtracting an individual elapsed time and a remaining process entire time from the in-line limit time is obtained for each of the number of production elements currently in the production system can result in accurate notification of an instruction of the next operation step that is to be carried out by the operator in which instruction the preferential degree of the operation step largely affects the in-line limit time and the preferential degree to preferentially carry out a manual step with less ample are considered, so that productivity efficiency can be improved.

The weights applied to the ample times of the production elements in the production system each time an production element is put into the production system can accurately instruct the operator of the next operation step determined in consideration of the preferential to realize the manner of first-in first-out, and therefore the production efficiency is improved.

Further, the calculation of an estimated entire ample time incorporates therein moving times that an operator requires to move between manual steps, so that an appropriate instruction of the next operation can be notified to the operator. Consequently, the production efficiency can be further improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. An operation instructing system for a production system comprising a plurality of production lines, a respective production process including manual steps to be carried out by an operator being carried out in each of the plurality of production lines, a number of production elements being successively entered into the production system for the production in the plurality of production lines, the operation instructing system notifying the operator of an instruction of a next manual step to be performed by the operator next, the operation instructing system comprising:

a process information retaining section retaining in advance, for each of the plurality of production lines, process information about a respective production process to be carried out in each of the plurality of production lines;

an individual process information obtaining section obtaining, each time each of the production elements is entered into the production system, the process information about one of the plurality of the production lines that is used to produce the entered production element;

a state information obtaining section obtaining, for each of the production elements currently in the production system, state information about remaining production process that is to be performed on each production element, on the basis of the process information obtained by the individual process information obtaining section;

a completion report obtaining section obtaining an operation completion report representing that the operator has completed one of the manual steps;

a determining section determining, each time the completion report obtaining section obtains the operation completion report, the next manual step that is to be performed next by the operator, as a next operation step, on the basis of the state information obtained by the state information obtaining section; and a notifying section notifying the operator of the next operation step determined by the determining section.

2. An operation instructing system according to claim 1, further comprising an in-line limit time retaining section retaining a limit of time period allowed for each of production elements on the production lines in advance, wherein the state information obtaining section obtains the respective state information of each said production element currently in the production system, the state information representing a margin time obtained by subtracting time elapsed since each said production element has been entered in the production system and a remaining process entire time representing an entire time of the remaining process that is to be performed on each said operation element from the in-line limit time retained by the in-line limit time retaining section.

3. An operation instructing system according to claim 2, further comprising a calculating section successively assuming, each time the completion report obtaining section obtains the operation completion report, the manual steps that are candidate for the next operation step in the production system on the basis of the process information obtained by state information obtaining section, and calculating an estimated entire margin time by summing the margin times of the production elements entered in the production system of each of the manual steps that are candidate for the next operation step that is assumed to be the next operation step, wherein the determining section determines one of the manual steps associated with a maximum estimated entire margin time among the estimated entire margin times calculated by the calculating section to be the next operation step.

4. An operation instructing system according to claim 3, further comprising a weighing section applying, each time when one of the production elements is entered in the production system, weights to the respective margin times of the production elements currently in the production system, wherein the calculating section incorporates the weights applied by the weighing section into calculation of the estimated entire margin times.

5. An operation instructing system according to claim 3, further comprising a moving time retaining section retaining moving times that the operator takes to move between the manual steps, wherein the calculating section incorporates the moving times retained in the moving time retaining section in calculation of the estimated entire margin times.

6. A method for instructing operation in a production system comprising a plurality of production lines, a respective production process including manual steps to be carried out by an operator being carried out in each of the plurality of production lines, a number of production elements being successively entered into the production system for the production in the plurality of production lines, the operation instructing system notifying the operator of an instruction of a next manual step to be performed by the operator next, the method comprising:

retaining in advance, for each of the plurality of production lines, process information about a respective production process to be carried out in each of the plurality of production lines;

obtaining, each time each of the production elements is entered into the production system, the process information about one of the plurality of the production lines that is used to produce the entered production element;

obtaining, for each of the production elements currently in the production system, state information about remaining production process that is to be performed on each of the production elements, on the basis of the process information obtained in the obtaining the process information;

obtaining an operation completion report representing that the operator has completed one of the manual steps;

determining, each time the obtaining completion report obtaining obtains the operation completion report, the next manual step that is to be performed next by the operator, as a next operation step, on the basis of the state information obtained in the obtaining state information; and notifying the operator of the next operation step determined in the determining.

7. A method for instructing operation according to claim 6, further comprising retaining a limit of time period allowed for each of production elements on the production lines in advance, wherein the obtaining state information obtains the respective state information of each said production element currently in the production system, the state information representing a margin time obtained by subtracting time elapsed since each said production element has been entered in the production system and a remaining process entire time representing an entire time of the remaining process that is to be performed on each said operation element from the in-line limit time retained in the retaining in-line limit time.

8. A method for instructing operation according to claim 7, further comprising successively assuming the manual steps that are candidate for the next operation step in the production system and calculating an estimated entire margin time by summing the margin times of the production elements of each of the manual steps that are candidate for the next operation step that is assumed to be the next operation step, wherein the determining determines one of the manual steps associated with a maximum estimated entire margin time among the estimated entire margin times calculated in the calculating to be the next operation step.

9. A method for instructing operation according to claim 8, further comprising applying, each time when one of the production elements is entered in the production system, weights to the respective margin times of the production elements currently in the production system, wherein the calculating incorporates the weights applied in the applying in the calculating of the estimated entire margin times.

10. An operation instructing apparatus for a production system comprising a plurality of production lines, a respective production process including manual steps to be carried out by an operator being carried out in each of the plurality of production lines, a number of production elements being successively entered into the production system for the production in the plurality of production lines, the operation instructing system notifying the operator of an instruction of a next manual step to be performed by the operator next, the operation instructing apparatus comprising:

a process information retaining section retaining in advance, for each of the plurality of production lines, process information about a respective production process to be carried out in each of the plurality of production lines;

an individual process information obtaining section obtaining, each time each of the production elements is entered into the production system, the process information about one of the plurality of the production lines that is used to produce the entered production element;

a state information obtaining section obtaining, for each of the production elements currently in the production system, state information about remaining production process that is to be performed on the each production element, on the basis of the process information obtained by the individual process information obtaining section;

a completion report obtaining section obtaining an operation completion report representing that the operator has completed one of the manual step;

a determining section determining, each time the completion report obtaining section obtains the operation completion report, the next manual step that is to be performed next by the operator, as a next operation step, on the basis of the state information obtained by the state information obtaining section; and an output section outputting the next operation step determined by the determining to an notifying section that notifies the operator of the next operation step.

11. An operation instructing apparatus according to claim 10, further comprising an in-line limit time retaining section retaining a limit of time period allowed for each of production elements on the production lines in advance, wherein the state information obtaining section obtains the respective state information of each said production element currently in the production system, the state information representing a margin time obtained by subtracting time elapsed since each said production element has been entered in the production system and a remaining process entire time representing an entire time of the remaining process that is to be performed on each said operation element from the in-line limit time retained by the in-line limit time retaining section.

12. An operation instructing apparatus according to claim 11, further comprising a calculating section successively assuming the manual steps that are candidate for the next operation step in the production system and calculating an estimated entire margin time by summing the margin agile times of the production elements of each of the manual steps that are candidate for the next operation step that is assumed to be the next operation step, wherein the determining section determines one of the manual steps associated with a maximum estimated entire margin time among the estimated entire margin times calculated by the calculating section to be the next operation step.

* * * * *